United States Patent
Yu et al.

(10) Patent No.: US 11,916,482 B2
(45) Date of Patent: Feb. 27, 2024

(54) DC/DC CONVERTER AND SOFT START OVERSHOOT PREVENTION METHOD THEREOF

(71) Applicant: Huawei Technologies Co., Ltd., Shenzhen (CN)

(72) Inventors: Guolei Yu, Dongguan (CN); Guiping Zhang, Dongguan (CN); Xuyang Wu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 17/681,452

(22) Filed: Feb. 25, 2022

(65) Prior Publication Data

US 2022/0278616 A1 Sep. 1, 2022

(30) Foreign Application Priority Data

Feb. 27, 2021 (CN) .......................... 202110221349.8

(51) Int. Cl.
*H02M 3/158* (2006.01)
*H02M 1/32* (2007.01)
*H02M 1/36* (2007.01)

(52) U.S. Cl.
CPC ............. *H02M 3/158* (2013.01); *H02M 1/32* (2013.01); *H02M 1/36* (2013.01)

(58) Field of Classification Search
CPC ........... H02M 3/158; H02M 1/32; H02M 1/36
See application file for complete search history.

(56) References Cited

U.S. PATENT DOCUMENTS

| 9,948,185 B2 * | 4/2018 | Unno ..................... H02M 3/156 |
| 2004/0160270 A1 | 8/2004 | Tzeng et al. |

(Continued)

FOREIGN PATENT DOCUMENTS

| CN | 203167383 U | 8/2013 |
| CN | 104731146 A | 6/2015 |

(Continued)

OTHER PUBLICATIONS

Buso et al., "Digital Control in Power Electronics, Aside 4.PI Current Controller with Integral Anti-wind-up," XP002681214, Total 2 Pages (Jan. 1, 2006).

*Primary Examiner* — Rafael O De Leon Domenech
(74) *Attorney, Agent, or Firm* — Leydig, Voit & Mayer, Ltd.

(57) ABSTRACT

A DC/DC converter includes a soft start overshoot prevention mechanism. The DC/DC converter includes a DC/DC conversion circuit, an overshoot detection apparatus, a pulse width modulation generator, an error amplifier, and an integration circuit connected to an output port of the error amplifier. The integration circuit is configured to perform integration processing on a difference between a reference voltage and an output voltage of the DC/DC conversion circuit, and control an amplitude of an amplified voltage that is input by the error amplifier to the pulse width modulation generator. The overshoot detection apparatus obtains an operating status parameter of the DC/DC converter, and controls, when the operating status parameter of the DC/DC converter meets an operating status parameter requirement, the integration circuit to discharge.

20 Claims, 8 Drawing Sheets

(56) References Cited

U.S. PATENT DOCUMENTS

| | | | | |
|---|---|---|---|---|
| 2008/0180071 A1* | 7/2008 | Moraveji | ............... | G05F 1/575 |
| | | | | 327/310 |
| 2009/0149970 A1 | 6/2009 | Miyamoto et al. | | |
| 2011/0156688 A1* | 6/2011 | Lin | ............... | H02M 3/00 |
| | | | | 323/284 |
| 2013/0038313 A1* | 2/2013 | Gotoh | ............... | H02M 3/156 |
| | | | | 323/288 |
| 2017/0070149 A1* | 3/2017 | Guan | ............... | H02M 1/36 |
| 2017/0188420 A1* | 6/2017 | Kido | ............... | H05B 47/24 |
| 2017/0264190 A1* | 9/2017 | Unno | ............... | H02M 3/156 |
| 2017/0317592 A1* | 11/2017 | Kawano | ............... | H02M 3/1588 |
| 2018/0249543 A1 | 8/2018 | Kober et al. | | |
| 2020/0235658 A1* | 7/2020 | Chen | ............... | H03K 5/24 |
| 2021/0257902 A1* | 8/2021 | Chang | ............... | H02M 1/32 |

FOREIGN PATENT DOCUMENTS

| | | |
|---|---|---|
| CN | 102906548 B | 12/2015 |
| CN | 105656300 A | 6/2016 |
| CN | 107834837 B | 8/2019 |
| CN | 112803742 A | 5/2021 |
| JP | 2004297983 A | 10/2004 |
| JP | 2009153278 A | 7/2009 |
| JP | 2010136572 A | 6/2010 |
| JP | 2012060819 A | 3/2012 |
| TW | 201630322 A | 8/2016 |

* cited by examiner

DC/DC CONVERTER AND SOFT START OVERSHOOT PREVENTION METHOD THEREOF

CROSS-REFERENCE TO RELATED APPLICATION

This application claims priority to Chinese Patent Application No. 202110221349.8, filed on Feb. 27, 2021, which is hereby incorporated by reference in its entirety.

TECHNICAL FIELD

This application relates to the field of electronic circuit technologies, and in particular, to a DC/DC converter and a soft start overshoot prevention method thereof.

BACKGROUND

A direct current-direct current converter (DC/DC converter) is a switching power supply component commonly used in an electronic system, and a main function of the DC/DC converter is to convert a direct current input voltage into a direct current output voltage of another potential, so as to meet a power supply requirement of an electronic system at a load end. An integration circuit is generally connected to an output port of an error amplifier in the DC/DC converter, and is configured to perform integration processing on a difference of voltages at input ports of the error amplifier (that is, a voltage difference between a reference voltage of a DC/DC conversion circuit and an output voltage) in a soft start process, that is, accumulate the voltage difference, and control an amplitude of an amplified voltage that is input by the error amplifier to a pulse width modulation generator. After the soft start ends (that is, when the DC/DC converter is operating normally), the voltage difference is accumulated, to minimize a difference between an output voltage of the DC/DC converter (that is, the output voltage of the DC/DC conversion circuit) and a target voltage.

In a startup and power-on process, the DC/DC converter needs to charge an output capacitor (correspondingly determining a capacitance of the output voltage of the DC/DC converter, that is, the output voltage of the DC/DC conversion circuit). In this process, a soft start is required to avoid an excessive charging current or overshooting of an output voltage at the end of charging, which exceeds a voltage range that the load can bear, causing load damage. The soft start is generally implemented in a manner in which a linear rising voltage is generated inside the DC/DC converter, and the output voltage is controlled by using a feedback circuit to rise to the target voltage at a same slope, thereby playing a function of a soft start and preventing current overshoot.

Because the output capacitor and the load during startup are greatly different with different application scenarios, using a single soft start voltage slope may cause an overshoot risk of the system in an extreme case. In the soft start process, if output capacitance is large, or a load current is large at the same time, a charging speed of the output capacitor may lag behind the soft start voltage slope (that is, a soft start voltage rising speed), causing an output of the integration circuit to be extremely high or saturated. When the soft start ends (that is, the output voltage reaches the target voltage), it takes time for the integration circuit to restore from the saturation state. In this process, excessive energy in an inductor is discharged to the output port, resulting in overshooting of the output voltage.

SUMMARY

This application provides a DC/DC converter and a soft start overshoot prevention method thereof, so as to effectively avoid a case in which an output of an integration circuit is excessively high or saturated when a soft start ends, thereby effectively avoiding a case in which output voltage overshoot occurs when the soft start of the DC/DC converter ends.

According to a first aspect, this application provides a DC/DC converter. The DC/DC converter includes a DC/DC conversion circuit, an overshoot detection apparatus, a pulse width modulation generator, an error amplifier, and an integration circuit connected to an output port of the error amplifier. The error amplifier is configured to: amplify a difference between an output voltage of the DC/DC conversion circuit and a reference voltage to generate an amplified voltage, and output the amplified voltage to the pulse width modulation generator. The pulse width modulation generator is configured to: generate a pulse width modulation wave based on the amplified voltage, and output the pulse width modulation wave to the DC/DC conversion circuit. The DC/DC conversion circuit is configured to control the output voltage of the DC/DC conversion circuit based on the pulse width modulation wave. The integration circuit is configured to: perform integration processing on the difference between the reference voltage and the output voltage, and control an amplitude of the amplified voltage that is input by the error amplifier to the pulse width modulation generator. The overshoot detection apparatus is configured to: obtain an operating status parameter of the DC/DC converter, and control the integration circuit to discharge when the operating status parameter of the DC/DC converter meets an operating status parameter requirement.

In this embodiment of this application, when the operating status parameter of the DC/DC converter meets the operating status parameter requirement, that is, when it is detected that the DC/DC converter has an output voltage overshoot risk, the overshoot detection apparatus controls the integration circuit to discharge, so as to effectively avoid a case in which an output of the integration circuit is excessively high or saturated when a soft start ends, thereby effectively avoiding a case in which output voltage overshoot occurs when the soft start of the DC/DC converter ends.

With reference to the first aspect, in a first exemplary implementation, the overshoot detection apparatus obtains the operating status parameter of the DC/DC converter when it is determined that a soft start voltage of the DC/DC converter is greater than or equal to a preset voltage threshold.

In this embodiment of this application, when the soft start voltage is greater than or equal to the preset voltage threshold, the overshoot detection apparatus obtains the operating status parameter of the DC/DC converter. Compared with a manner of obtaining the operating status parameter of the DC/DC converter when the soft start starts, this embodiment enables the DC/DC converter to perform the soft start at an initial soft start voltage slope before the soft start voltage is less than the preset voltage threshold, thereby avoiding premature interference from the overshoot detection apparatus, and further shortening soft start duration.

With reference to the first aspect, in a second exemplary implementation, the DC/DC converter further includes an overcurrent protection circuit. The overcurrent protection circuit is connected to the overshoot detection apparatus, and is configured to output an overcurrent signal to the overshoot detection apparatus when the overcurrent protection circuit is triggered. The overshoot detection apparatus controls the integration circuit to discharge when the operating status parameter of the DC/DC converter meets the operating status parameter requirement, and a quantity of times of receiving the overcurrent signal output by the overcurrent protection circuit within first preset duration is greater than or equal to a preset quantity threshold.

In this embodiment of this application, an excessively large current stored in an inductor is also a reason for output voltage overshoot of the DC/DC converter. Therefore, the manner of determining whether the operating status parameter of the DC/DC converter meets the operating status parameter requirement and whether the quantity of times of receiving the overcurrent signal output by the overcurrent protection circuit within the first preset duration is greater than or equal to the preset quantity threshold is used to determine whether the DC/DC converter has an overshoot risk, so as to further improve accuracy of overshoot risk detection.

With reference to the first aspect, in a third exemplary implementation, the operating status parameter requirement includes that a duration proportion of total duration in which the operating status parameter of the DC/DC converter is greater than or equal to the preset operating status parameter threshold within second preset duration to the second preset duration is greater than or equal to a preset proportion threshold.

In this embodiment of this application, a case in which an overshoot risk of the DC/DC converter is determined due to a false touch or incorrect sampling data can be prevented, so that accuracy of overshoot risk detection is improved.

With reference to the first aspect, in a fourth exemplary implementation, when the operating status parameter of the DC/DC converter meets the operating status parameter requirement, the integration circuit is controlled to discharge, and a soft start voltage slope of the DC/DC converter is reduced.

In this embodiment of this application, a manner of reducing the soft start voltage slope is added, so as to avoid a case in which the difference accumulated on the capacitor C continuously increases and a vicious cycle occurs because the rising slope of the output voltage lags behind the soft start voltage slope due to a single soft start voltage slope. In addition, this can further effectively avoid a case in which the output of the capacitor C is excessively high or saturated when the soft start ends, so as to effectively avoid a case in which output voltage overshoot occurs when the soft start of the DC/DC converter ends.

With reference to the first aspect, in a fifth exemplary implementation, the DC/DC converter further includes a switching power transistor that is connected to the integration circuit in parallel, and the switching power transistor is connected to the overshoot detection apparatus. The overshoot detection apparatus controls connectivity of the switching power transistor to discharge the integrating circuit.

In this embodiment of this application, the overshoot detection apparatus may discharge the integrating circuit by using the switching power transistor parallel to the integration circuit, so as to effectively avoid a case in which the output of the integration circuit is excessively high or saturated when the soft start ends, thereby effectively avoiding a case in which output voltage overshoot occurs when the soft start of the DC/DC converter ends, and improving security in the soft start process.

With reference to the first aspect, in a sixth exemplary implementation, a soft start voltage slope of the DC/DC converter is set to an initial soft start voltage slope when the operating status parameter of the DC/DC converter does not meet the operating status parameter requirement.

In this embodiment of this application, when it is determined that the DC/DC converter does not have an overshoot risk, the soft start is performed at the initial soft start slope, so that a soft start time can be effectively shortened.

With reference to the first aspect, in a seventh exemplary implementation, the operating status parameter includes at least one of the voltage difference between the reference voltage and the output voltage, the amplified voltage, or a duty cycle of the pulse width modulation wave.

In this embodiment of this application, whether an overshoot risk exists in the DC/DC converter may be determined based on whether an operating status parameter of the error amplifier or the pulse width modulation generator meets the preset operating status parameter requirement.

With reference to the first aspect, in an eighth exemplary implementation, the reference voltage includes a constant voltage reference or the soft start voltage of the DC/DC converter.

In this embodiment of this application, the error amplifier may be an error amplifier with two input ports. In the soft start process, the reference voltage is the soft start voltage. At the end of the soft start, the reference voltage is the constant voltage reference.

With reference to the first aspect, in a ninth exemplary implementation, the reference voltage includes a smaller value of a constant voltage reference and the soft start voltage of the DC/DC converter.

In this embodiment of this application, the error amplifier may be an error amplifier with three input ports.

According to a second aspect, this application provides a soft start overshoot prevention method for a DC/DC converter. The DC/DC converter includes a DC/DC conversion circuit, an overshoot detection apparatus, a pulse width modulation generator, an error amplifier, and an integration circuit connected to an output port of the error amplifier. The error amplifier is configured to: amplify a difference between an output voltage of the DC/DC converter and a reference voltage to generate an amplified voltage, and output the amplified voltage to the pulse width modulation generator. The pulse width modulation generator is configured to: generate a pulse width modulation wave based on the amplified voltage, and output the pulse width modulation wave to the DC/DC conversion circuit. The DC/DC conversion circuit is configured to control the output voltage of the DC/DC conversion circuit based on the pulse width modulation wave. The integration circuit is configured to: perform integration processing on the difference between the reference voltage and the output voltage, and control an amplitude of the amplified voltage that is input by the error amplifier to the pulse width modulation generator. The overshoot detection apparatus is configured to: obtain an operating status parameter of the DC/DC converter, and control the integration circuit to discharge when the operating status parameter of the DC/DC converter meets an operating status parameter requirement.

In this embodiment of this application, when the operating status parameter of the DC/DC converter meets the operating status parameter requirement, that is, when it is detected that the DC/DC converter has an output voltage overshoot risk, the overshoot detection apparatus controls the integration circuit to discharge, so as to effectively avoid a case in which an output of the integration circuit is excessively high or saturated when a soft start ends, thereby effectively avoiding a case in which output voltage overshoot occurs when the soft start of the DC/DC converter ends.

With reference to the second aspect, in a first exemplary implementation, before obtaining the operating status parameter of the DC/DC converter, the overshoot detection apparatus determines that a soft start voltage of the DC/DC converter is greater than or equal to a preset voltage threshold.

In this embodiment of this application, when the soft start voltage is greater than or equal to the preset voltage threshold, the overshoot detection apparatus obtains the operating status parameter of the DC/DC converter. Compared with a manner of obtaining the operating status parameter of the DC/DC converter when the soft start starts, this embodiment enables the DC/DC converter to perform the soft start at an initial soft start voltage slope before the soft start voltage is less than the preset voltage threshold, thereby avoiding premature interference from the overshoot detection apparatus, and further shortening soft start duration.

With reference to the second aspect, in a second exemplary implementation, the DC/DC converter further includes an overcurrent protection circuit. The overcurrent protection circuit is connected to the overshoot detection apparatus, and is configured to output an overcurrent signal to the overshoot detection apparatus when the overcurrent protection circuit is triggered. The overshoot detection apparatus controls the integration circuit to discharge when the operating status parameter of the DC/DC converter meets the operating status parameter requirement, and a quantity of times of receiving the overcurrent signal output by the overcurrent protection circuit within first preset duration is greater than or equal to a preset quantity threshold.

In this embodiment of this application, an excessively large current stored in an inductor is also a reason for output voltage overshoot of the DC/DC converter. Therefore, the manner of determining whether the operating status parameter of the DC/DC converter meets the operating status parameter requirement and whether the quantity of times of receiving the overcurrent signal output by the overcurrent protection circuit within the first preset duration is greater than or equal to the preset quantity threshold is used to determine whether the DC/DC converter has an overshoot risk, so as to further improve accuracy of overshoot risk detection.

With reference to the second aspect, in a third exemplary implementation, the operating status parameter requirement includes that a duration proportion of total duration in which the operating status parameter of the DC/DC converter is greater than or equal to the preset operating status parameter threshold within second preset duration to the second preset duration is greater than or equal to a preset proportion threshold.

In this embodiment of this application, a case in which an overshoot risk of the DC/DC converter is determined due to a false touch or incorrect sampling data can be prevented, so that accuracy of overshoot risk detection is improved.

With reference to the second aspect, in a fourth exemplary implementation, when the operating status parameter of the DC/DC converter meets the operating status parameter requirement, the integration circuit is controlled to discharge, and a soft start voltage slope of the DC/DC converter is reduced.

In this embodiment of this application, a manner of reducing the soft start voltage slope is added, so as to avoid a case in which the difference accumulated on the capacitor C continuously increases and a vicious cycle occurs because the rising slope of the output voltage lags behind the soft start voltage slope due to a single soft start voltage slope. In addition, this can further effectively avoid a case in which the output of the capacitor C is excessively high or saturated when the soft start ends, so as to effectively avoid a case in which output voltage overshoot occurs when the soft start of the DC/DC converter ends.

With reference to the second aspect, in a fifth exemplary implementation, the DC/DC converter further includes a switching power transistor that is connected to the integration circuit in parallel, and the switching power transistor is connected to the overshoot detection apparatus. The overshoot detection apparatus controls connectivity of the switching power transistor to discharge the integrating circuit.

In this embodiment of this application, the overshoot detection apparatus may discharge the integrating circuit by using the switching power transistor parallel to the integration circuit, so as to effectively avoid a case in which the output of the integration circuit is excessively high or saturated when the soft start ends, thereby effectively avoiding a case in which output voltage overshoot occurs when the soft start of the DC/DC converter ends, and improving security in the soft start process.

With reference to the second aspect, in a sixth exemplary implementation, a soft start voltage slope of the DC/DC converter is set to an initial soft start voltage slope when the operating status parameter of the DC/DC converter does not meet the operating status parameter requirement.

In this embodiment of this application, when it is determined that the DC/DC converter does not have an overshoot risk, the soft start is performed at the initial soft start slope (that is, a maximum slope), so that a soft start time can be effectively shortened.

With reference to the second aspect, in a seventh exemplary implementation, the operating status parameter includes at least one of the voltage difference between the reference voltage and the output voltage, the amplified voltage, or a duty cycle of the pulse width modulation wave.

In this embodiment of this application, whether an overshoot risk exists in the DC/DC converter may be determined based on whether an operating status parameter of the error amplifier or the pulse width modulation generator meets the preset operating status parameter requirement.

With reference to the second aspect, in an eighth exemplary implementation, the reference voltage includes a constant voltage reference or the soft start voltage of the DC/DC converter.

In this embodiment of this application, the error amplifier may be an error amplifier with two input ports. In the soft start process, the reference voltage is the soft start voltage. At the end of the soft start, the reference voltage is the constant voltage reference.

With reference to the second aspect, in a ninth exemplary implementation, the reference voltage includes a smaller value of a constant voltage reference and the soft start voltage of the DC/DC converter.

In this embodiment of this application, the error amplifier may be an error amplifier with three input ports.

DESCRIPTION OF EMBODIMENTS

Figure 1:
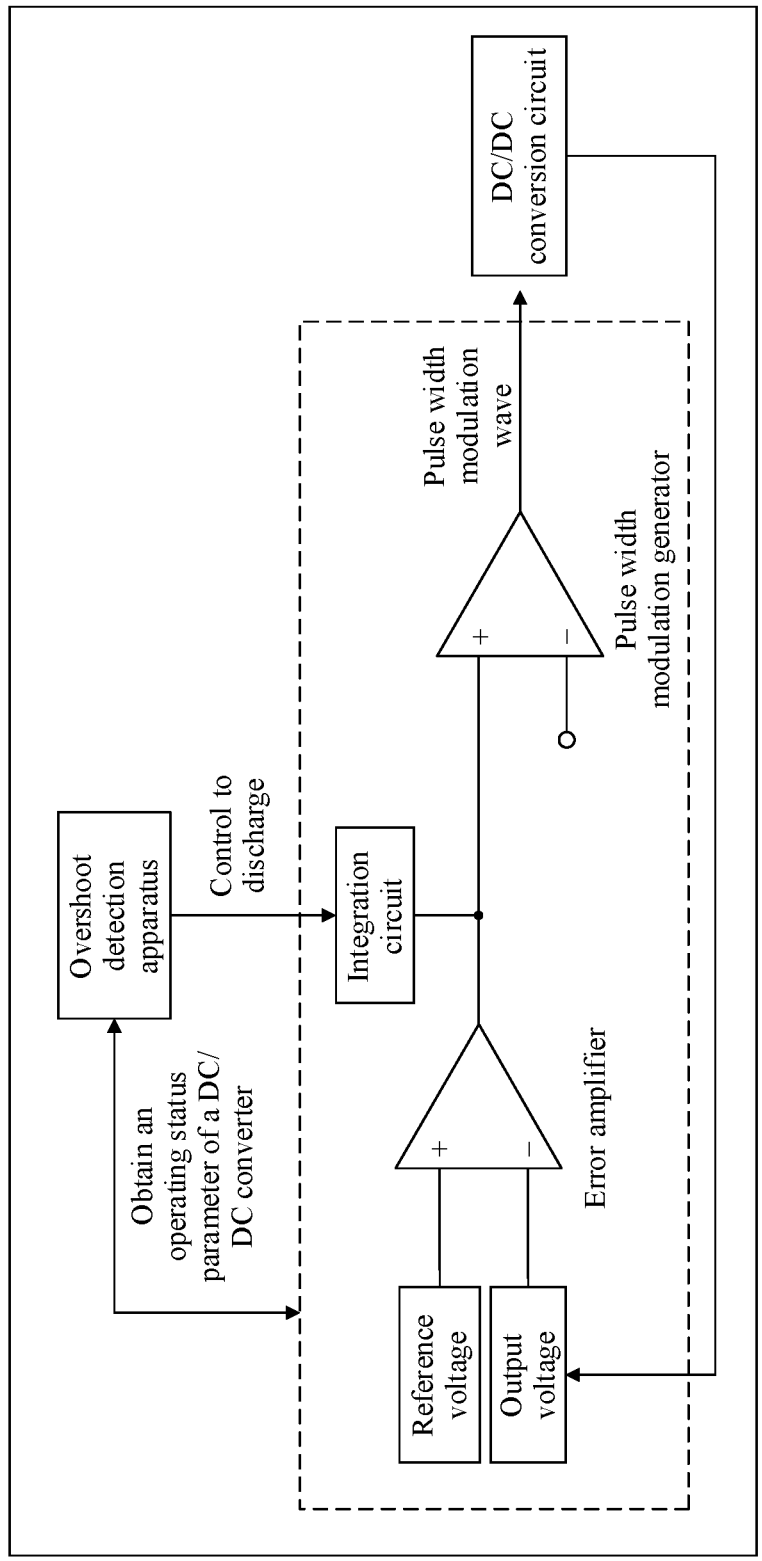
FIG. 1 is a schematic diagram of a structure of a DC/DC converter according to this application.

A DC/DC converter is a switching power supply component commonly used in an electronic system, and a main function of the DC/DC converter is to convert a direct current input voltage into a direct current output voltage of another potential, so as to meet a power supply requirement of an electronic system at a load end. To improve a response speed of an electronic system and create better user experience, a computing system, such as a central processing unit (CPU), a graphics processing unit (GPU), or a field programmable gate array (FPGA), requires a faster power-on speed of a power source (usually a DC/DC converter) of the electronic system, and a start delay and a start time need to be reduced as much as possible.

In a startup and power-on process, the DC/DC converter needs to charge an output capacitor. In this process, a soft start is required to avoid an excessive charging current or overshooting of an output voltage at the end of charging, which exceeds a voltage range that the load can bear, causing load damage. The soft start of the DC/DC converter is generally implemented in a manner in which a linear rising voltage is generated inside the DC/DC converter, and an output voltage of the DC/DC converter is controlled by using a feedback circuit to rise to a target voltage at a same slope, thereby playing a function of a soft start and preventing current overshoot. Because the output capacitor of the DC/DC converter and the load during startup are greatly different with different application scenarios, using a single soft start slope may cause an overshoot risk of the system in an extreme case or an excessive design margin in a non-extreme case, and system optimization cannot be achieved.

An integration circuit is generally connected to an output port of an error amplifier in the DC/DC converter, and is configured to perform integration processing on a difference of voltages at input ports of the error amplifier (that is, a voltage difference between a reference voltage of a DC/DC conversion circuit and an output voltage) in a soft start process, that is, accumulate the voltage difference, and control an amplitude of an amplified voltage that is input by the error amplifier to a pulse width modulation generator. After the soft start ends (that is, when the DC/DC converter is operating normally), the voltage difference is accumulated, to minimize a difference between an output voltage of the DC/DC converter and a target voltage.

In the soft start process, if output capacitance is large, or a load current is large at the same time, a charging speed of the output capacitor may lag behind a soft start voltage slope, and the internal integration circuit of the DC/DC converter accumulates a large difference, causing an output of the integration circuit to be excessively high or saturated. When the soft start ends, it takes time for the integration circuit to restore from the saturation state. In this process, excessive energy in an inductor is discharged to the output port, resulting in overshooting of the output voltage of the DC/DC converter.

For an output voltage overshoot problem in the foregoing soft start process, this application provides a DC/DC converter and a soft start overshoot prevention method for the DC/DC converter to cover different application scenarios. The DC/DC converter may be powered on safely and quickly for different output capacitors and load situations. In a specific implementation, in a soft start process, if it is detected that an operating status parameter of the DC/DC converter meets an operating status parameter requirement, that is, when it is detected that an overshoot risk exists in the DC/DC converter, the integration circuit is discharged in a timely manner, so as to effectively avoid a case in which an output of the integration circuit is excessively high or saturated when the soft start ends, thereby effectively avoiding a case in which output voltage overshoot occurs when the soft start of the DC/DC converter ends.

FIG. 1 is a schematic diagram of a structure of a DC/DC converter according to this application. As shown in FIG. 1, the DC/DC converter includes a DC/DC conversion circuit, an overshoot detection apparatus, a pulse width modulation generator, an error amplifier, and an integration circuit connected to an output port of the error amplifier.

The error amplifier is configured to: amplify a difference between an output voltage of the DC/DC conversion circuit and a reference voltage to generate an amplified voltage, and output the amplified voltage at the output port to a positive input port of the pulse width modulation generator. Optionally, the amplified voltage herein may alternatively be obtained by amplifying a difference between the reference voltage and an output voltage of the DC/DC conversion circuit that is obtained through voltage division (that is, a voltage proportional to the output voltage of the DC/DC conversion circuit). Herein, the reference voltage includes a soft start voltage of the DC/DC converter or a constant voltage reference. Specifically, in a soft start process, the reference voltage is the soft start voltage, and is generally a voltage value of both ports of a capacitor in a soft start circuit of the DC/DC converter. When the soft start ends, the reference voltage is the constant voltage reference.

The pulse width modulation generator is configured to: generate a pulse width modulation wave based on the amplified voltage and output the pulse width modulation wave to the DC/DC conversion circuit. Specifically, the pulse width modulation generator may generate the pulse width modulation wave based on the amplified voltage and a sawtooth signal.

The DC/DC conversion circuit is configured to control the output voltage of the DC/DC conversion circuit based on the pulse width modulation wave. Specifically, the DC/DC conversion circuit controls on duration of a switching power transistor in the DC/DC conversion circuit based on the pulse width modulation wave, to control charging duration of an output capacitor in the DC/DC conversion circuit, so as to control the output voltage of the DC/DC conversion circuit.

The integration circuit is configured to perform integration processing on the voltage difference between the reference voltage and the output voltage in the soft start process, that is, accumulate the voltage difference, and control an amplitude of the amplified voltage that is input by the error amplifier to the pulse width modulation generator. After the soft start ends (that is, when the DC/DC converter is operating normally), the voltage difference is accumulated, to minimize a difference between an output voltage of the DC/DC converter (that is, the output voltage of the DC/DC conversion circuit) and a target voltage.

Optionally, the error amplifier may be an error amplifier with three ports for inputting. In this case, the reference voltage is a smaller value of the soft start voltage and the constant voltage reference. A connection relationship between the error amplifier and the pulse width modulation generator may alternatively be: the output port of the error amplifier is connected to a negative input port of the pulse width modulation generator. This can improve applicability of the DC/DC converter.

The overshoot detection apparatus is configured to: obtain an operating status parameter of the DC/DC converter; and when the operating status parameter of the DC/DC converter meets an operating status parameter requirement, that is, when it is detected that an output voltage overshoot risk exists in the DC/DC converter, control the integration circuit to discharge. This can effectively avoid a case in which an output of the integration circuit is excessively high or saturated when the soft start ends, thereby effectively avoiding a case in which output voltage overshoot occurs when the soft start of the DC/DC converter ends.

Figure 2A:
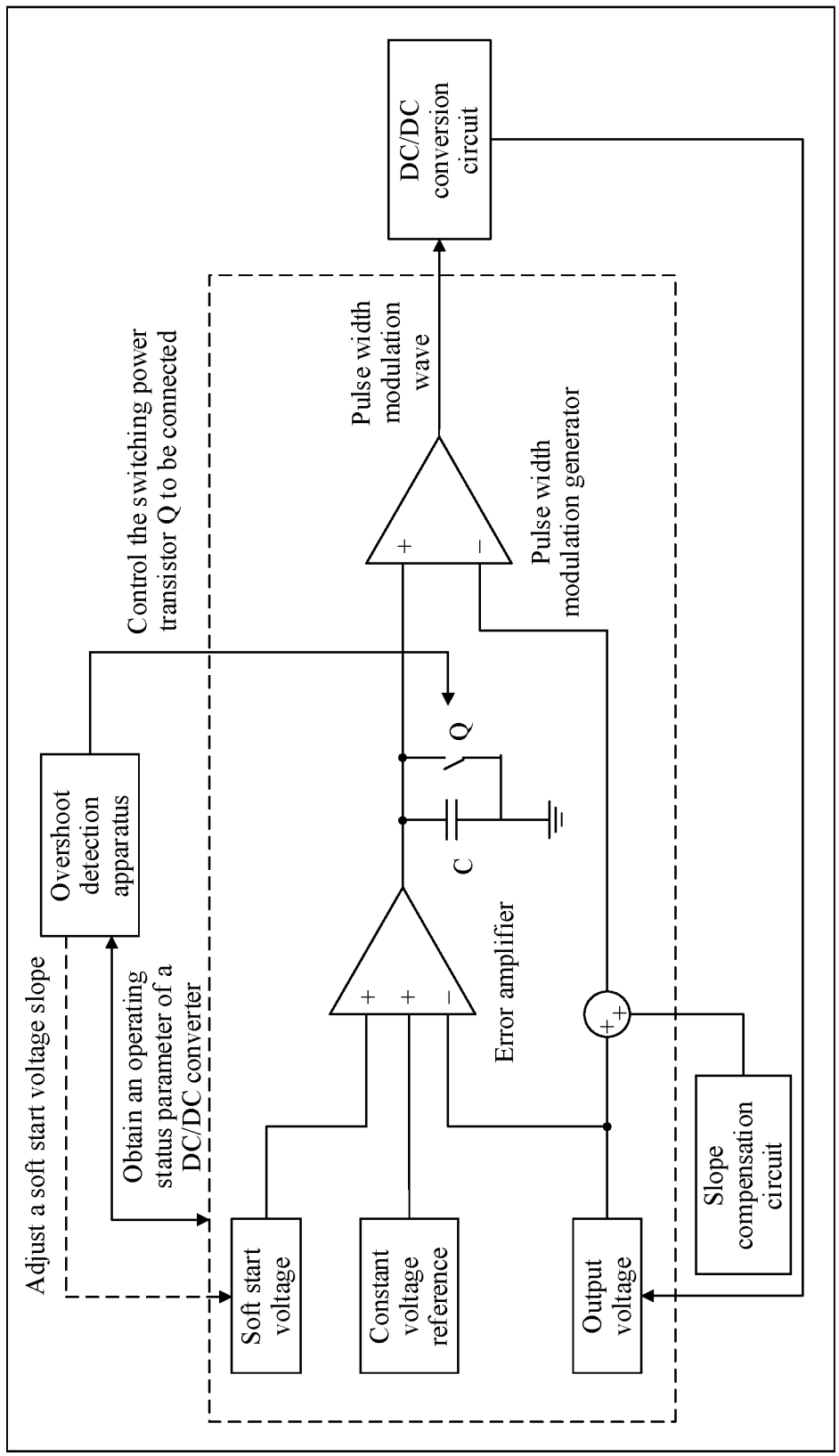
FIG. 2a is a schematic diagram of a structure of a DC/DC converter that uses a ripple control mode according to this application.

For example, FIG. 2a is a schematic diagram of a structure of a DC/DC converter that uses a ripple control mode according to this application. As shown in FIG. 2a, the DC/DC converter includes a DC/DC converter, an overshoot detection apparatus, an error amplifier with three input ports, a pulse width modulation generator, and an integration circuit connected to an output port of the error amplifier. An output voltage of the DC/DC conversion circuit is connected to a negative input port of the error amplifier, a constant voltage reference and a soft start voltage are connected to two positive input ports of the error amplifier, and a voltage difference between the output voltage of the DC/DC conversion circuit and a lower voltage in the constant voltage reference and the soft start voltage is amplified by the error amplifier to obtain an amplified voltage. Usually, there is an integration circuit connected to the output port of the error amplifier, and the integration circuit is configured to perform integration processing on the voltage difference in a soft start process and control an amplitude of the amplified voltage that is input by the error amplifier to the pulse width modulation generator. After the soft start ends (that is, when the DC/DC converter is operating normally), the voltage difference is accumulated, to minimize a difference between an output voltage of the DC/DC converter and a target voltage. The integration circuit shown in FIG. 2a is a capacitor C whose two ports are respectively connected to the output port of the error amplifier and a ground terminal. Another form of integration circuit may also be used. The output of the error amplifier is connected to a positive input port of the pulse width modulation generator. Another branch of the output voltage of the DC/DC conversion circuit is connected to a positive input port of an adder circuit, a slope compensation circuit is connected to another positive input port of the adder circuit, and an output port of the adder circuit is connected to a negative input port of the pulse width modulation generator. When a voltage at the output port of the adder circuit is lower than the error amplifier output by the error amplifier, the pulse width modulation generator outputs a high level; and vice versa. Optionally, the pulse width modulation generator may generate a pulse width modulation signal in another manner, for example, in a fixed connection time. In addition, the DC/DC converter further includes a switching power transistor Q connected to the capacitor C in parallel. The switching power transistor is configured to discharge the capacitor C. The switching power transistor Q may include but is not limited to a MOS transistor, an IGBT, a diode, a triode, and the like. Further, the switching power transistor Q may include a clamping circuit, configured to control voltage values at both ports of the capacitor C, so as to discharge the capacitor C. Optionally, discharging the capacitor C may alternatively be implemented by using a voltage buffer.

When detecting that the soft start voltage is greater than or equal to a preset voltage threshold (for example, 50% of the constant voltage reference), or after preset duration after the soft start starts, the overshoot detection apparatus starts to obtain an operating status parameter of the DC/DC converter. When the operating status parameter of the DC/DC converter meets a preset operating status parameter requirement, that is, when it is determined that the DC/DC converter has an overshoot risk, the integration circuit is controlled to discharge. The operating status parameter of the DC/DC converter includes at least one of the voltage difference between the reference voltage (that is, the smaller value in the soft start voltage and the constant voltage reference) and the output voltage of the DC/DC conversion circuit, the amplified voltage, or a duty cycle of a pulse width modulation wave.

In some feasible implementations, the operating status parameter requirement of the DC/DC converter includes that the operating status parameter of the DC/DC converter is greater than or equal to a preset operating status parameter threshold.

Specifically, the preset operating status parameter requirement may include at least one of the following: The voltage difference between the reference voltage and the output voltage of the DC/DC conversion circuit is greater than or equal to a preset voltage difference threshold, the amplified voltage is greater than or equal to a preset amplified voltage threshold, or the duty cycle of the pulse width modulation wave is greater than or equal to a preset duty cycle threshold. It may be understood that, whether an overshoot risk exists in the DC/DC converter may be determined based on whether the operating status parameter of the error amplifier or the pulse width modulation generator meets the preset operating status parameter requirement.

For example, when the soft start voltage is equal to 50% of the constant voltage reference, the overshoot detection apparatus starts to collect the soft start voltage and the output voltage of the DC/DC conversion circuit, calculates a voltage difference between the soft start voltage and the output voltage of the DC/DC conversion circuit, and if it is detected that the voltage difference is greater than a preset voltage difference threshold, determines that the operating status parameter of the DC/DC converter meets the preset operating status parameter requirement.

For another example, after a period of 10 ms after the soft start starts, the overshoot detection apparatus starts to collect the amplified voltage and the duty cycle of the pulse width modulation wave, and if it is detected that the amplified voltage is greater than a preset amplified voltage threshold, and the duty cycle 80% of the pulse width modulation wave is greater than a preset duty cycle threshold 70%, determines that the operating status parameter of the DC/DC converter meets the preset operating status parameter requirement.

For another example, when the soft start voltage is equal to 60% of the constant voltage reference, the overshoot detection apparatus starts to collect the soft start voltage of the DC/DC converter, the output voltage of the DC/DC conversion circuit, the amplified voltage, and the duty cycle of the pulse width modulation wave, calculates a voltage difference between the soft start voltage and the output voltage, and if it is detected that the voltage difference is greater than a preset voltage difference threshold, the amplified voltage is greater than a preset amplified voltage threshold, and the duty cycle 90% of the pulse width modulation wave is greater than a preset duty cycle threshold 80%, determines that the operating status parameter of the DC/DC converter meets the preset operating status parameter requirement.

In other feasible implementations, the operating status parameter requirement of the DC/DC converter includes that a duration proportion of total duration in which the operating status parameter of the DC/DC converter is greater than or equal to the preset operating status parameter threshold within second preset duration to the second preset duration is greater than or equal to a preset proportion threshold.

Specifically, the preset operating status parameter may be at least one of the following: A duration proportion of total duration in which a voltage difference between the reference voltage and the output voltage of the DC/DC conversion circuit is greater than or equal to a preset voltage difference threshold within the second preset duration to the second preset duration is greater than a first preset proportion threshold; or a duration proportion of total duration in which the amplified voltage is greater than or equal to a preset amplified voltage threshold within the second preset duration to the second preset duration is greater than a second preset proportion threshold; or a duration proportion of total duration in which the duty cycle of the pulse width modulation wave is greater than or equal to a preset duty cycle threshold within the second preset duration to the second preset duration is greater than a third preset proportion threshold. The first preset proportion threshold, the second preset proportion threshold, and the third preset proportion threshold may be totally the same, or may be different from each other. This is not limited herein.

For example, when the soft start voltage is equal to 50% of the constant voltage reference, the overshoot detection apparatus starts timing and obtains the amplified voltage. In amplified voltages obtained within 5 ms after the timing starts, if an amplified voltage in the first millisecond, an amplified voltage in a period from the third millisecond to the fourth millisecond, and an amplified voltage in a period from the fourth millisecond to the fifth millisecond are all greater than a preset amplified voltage threshold, a duration proportion 60% of total duration (3 ms) in which the amplified voltages are all greater than the preset amplified voltage threshold within 5 ms to 5 ms may be obtained and is greater than the second preset proportion threshold 50%. In this case, it is determined that the operating status parameter of the DC/DC converter meets the preset operating status parameter requirement.

For another example, when the soft start voltage is equal to 60% of the constant voltage reference, the overshoot detection apparatus starts timing and obtains the duty cycle of the pulse width modulation wave. It is assumed that, in duty cycles of the pulse width modulation wave that are obtained within 5 ms after the timing starts, duty cycles of the pulse width modulation wave in a period from the first millisecond to the fourth millisecond are all greater than a preset duty cycle threshold 80%. In this case, a duration proportion 60% of total duration (3 ms) in which the duty cycles of the pulse width modulation wave are all greater than the preset duty cycle threshold within 5 ms to 5 ms is equal to the third preset proportion threshold 60%. In this case, it is determined that the operating status parameter of the DC/DC converter meets the preset operating status parameter requirement.

It may be understood that the operating status parameter requirement in this implementation may prevent a case in which the operating status parameter requirement in the previous implementation is still met due to a false touch or incorrect sampling data, thereby improving accuracy of overshoot risk detection.

Then, discharging of the integration circuit is controlled when the operating status parameter of the DC/DC converter meets the preset operating status parameter requirement.

In some feasible implementations, when the operating status parameter of the DC/DC converter meets the preset operating status parameter requirement, the overshoot detection apparatus outputs a high level to the switching power transistor Q, to enable the switching power transistor Q to be connected, so as to discharge the capacitor C. Further, the overshoot detection apparatus may further output, to the switching power transistor Q based on the amplified voltage value, a pulse width modulation wave of a duty cycle corresponding to the amplified voltage value, so as to control connection duration of the switching power transistor Q, so as to implement full or partial discharge of the capacitor C.

It may be understood that in this implementation, the manner of discharging the capacitor C when it is determined that the DC/DC converter has an overshoot risk can effectively avoid a case in which the output of the capacitor C is excessively high or saturated when the soft start ends, thereby effectively avoiding a case in which output voltage overshoot occurs when the soft start of the DC/DC converter ends.

In other feasible implementations, when the operating status parameter of the DC/DC converter meets the preset operating status parameter requirement, the overshoot detection apparatus outputs a high level to the switching power transistor Q, to enable the switching power transistor Q to be connected, so as to discharge the capacitor C. In addition, a soft start voltage slope of the DC/DC converter is reduced, that is, the soft start voltage slope is reduced from an initial soft start voltage slope to a first soft start voltage slope. The first soft start voltage slope is a positive number that is less than the initial soft start voltage slope. For example, the overshoot detection apparatus may reduce a charging current of a capacitor in a soft start circuit, to reduce the soft start voltage, so as to reduce the soft start voltage slope. The overshoot detection apparatus may alternatively reduce the soft start voltage slope by using a stepper slope.

It may be understood that, compared with the previous implementation, in this implementation, a manner of reducing the soft start voltage slope is added, so as to avoid a case in which the difference accumulated on the capacitor C continuously increases and a vicious cycle occurs because the rising slope of the output voltage lags behind the soft start voltage slope due to a single soft start voltage slope. In addition, this can further effectively avoid a case in which the output of the capacitor C is excessively high or saturated when the soft start ends, so as to effectively avoid a case in which output voltage overshoot occurs when the soft start of the DC/DC converter ends.

In addition, the overshoot detection apparatus sets the soft start voltage slope of the DC/DC converter to the initial soft start voltage slope when the operating status parameter of the DC/DC converter does not meet the operating status parameter requirement. Herein, the soft start voltage slope may alternatively be adjusted by using a charging current or a stepper slope.

It may be understood that when it is determined that the DC/DC converter does not have an overshoot risk, the soft start is performed at the initial soft start slope, so that a soft start time can be effectively shortened. It may be further explained herein that after the soft start voltage slope is reduced, when it is determined that the DC/DC converter no longer has an overshoot risk, the overshoot detection apparatus increases the reduced soft start voltage slope to the initial soft start slope, so as to effectively improve soft start efficiency.

In this embodiment of this application, in a soft start process, if it is detected that the operating status parameter of the DC/DC converter meets the operating status parameter requirement, that is, when it is determined that an overshoot risk exists in the DC/DC converter, the overshoot detection apparatus controls a discharge circuit (the switching power transistor Q) to discharge the integration circuit, so as to avoid a case in which the output of the integration circuit is excessively high or saturated, thereby effectively avoiding a case in which output voltage overshoot occurs when the soft start of the DC/DC converter ends. Further, when an overshoot risk of the DC/DC converter is detected, the soft start voltage slope may be further reduced. Because a main reason for output voltage overshoot of the DC/DC converter is that the rising slope of the output voltage of the DC/DC converter lags behind the soft start voltage slope, the foregoing manner can further avoid a case in which output voltage overshoot of the DC/DC converter occurs when the soft start ends.

Figure 2B:
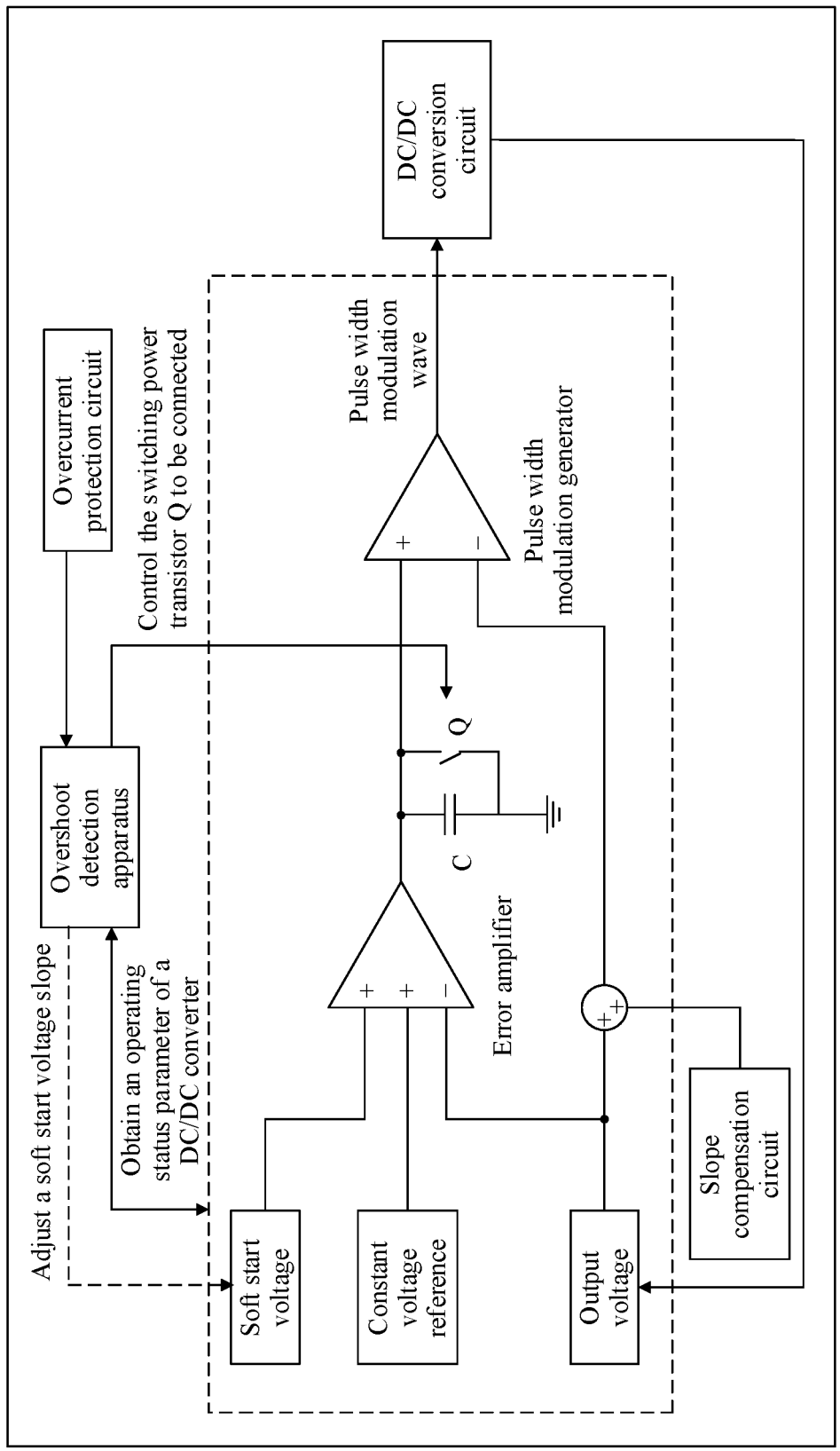
FIG. 2b is a schematic diagram of a structure of another DC/DC converter that uses a ripple control mode according to this application.

Further, the DC/DC converter shown in FIG. 2a may further include an overcurrent protection circuit. For details, refer to a schematic diagram of a structure of another DC/DC converter that uses a ripple control mode shown in FIG. 2b. As shown in FIG. 2b, an output port of the overcurrent protection circuit is connected to the overshoot detection apparatus, and the overcurrent protection circuit is configured to output an overcurrent signal (that is, a narrow pulse signal) to the overshoot detection apparatus when the overcurrent protection circuit is triggered (that is, an inductor current value of the DC/DC conversion circuit is greater than or equal to a preset current threshold).

The overshoot detection apparatus controls the integration circuit to discharge when the operating status parameter of the DC/DC converter meets the operating status parameter requirement, and a quantity of times of receiving the overcurrent signal output by the overcurrent protection circuit within first preset duration is greater than or equal to a preset quantity threshold.

In some feasible implementations, the preset operating status parameter requirement may include at least one of the following: The voltage difference between the reference voltage and the output voltage is greater than or equal to a preset voltage difference threshold, the amplified voltage is greater than or equal to a preset amplified voltage threshold, or the duty cycle of the pulse width modulation wave is greater than or equal to a preset duty cycle threshold.

For example, when the soft start voltage is equal to 50% of the constant voltage reference, the overshoot detection apparatus starts timing and obtains the soft start voltage and the output voltage of the DC/DC conversion circuit. If a calculated voltage difference between the soft start voltage and the output voltage is greater than a preset voltage difference threshold, and an overcurrent signal is received once in each of three consecutive periods within 3 ms, a quantity of times of receiving the overcurrent signal within 3 ms is greater than a preset quantity threshold (2 times). In this case, the integration circuit is controlled to discharge.

In other feasible implementations, the preset operating status parameter may be at least one of the following: A duration proportion of total duration in which a voltage difference between the reference voltage and the output voltage is greater than or equal to a preset voltage difference threshold within the second preset duration to the second preset duration is greater than a first preset proportion threshold; or a duration proportion of total duration in which the amplified voltage is greater than or equal to a preset amplified voltage threshold within the second preset duration to the second preset duration is greater than a second preset proportion threshold; or a duration proportion of total duration in which the duty cycle of the pulse width modulation wave is greater than or equal to a preset duty cycle threshold within the second preset duration to the second preset duration is greater than a third preset proportion threshold. A time period corresponding to the first preset duration and a time period corresponding to the second preset duration may be all the same, or may be partially the same. This is not limited herein.

For example, when the soft start voltage is equal to 60% of the constant voltage reference, the overshoot detection apparatus starts timing and obtains the duty cycle of the pulse width modulation wave. It is assumed that, in duty cycles of the pulse width modulation wave that are obtained within 5 ms, duty cycles of the pulse width modulation wave in the second millisecond, the third millisecond, and the fourth millisecond are all greater than a preset duty cycle threshold 80%. In this case, a duration proportion 60% of total duration (3 ms) in which the duty cycles of the pulse width modulation wave are all greater than the preset duty cycle threshold within 5 ms to 5 ms is equal to the third preset proportion threshold 60%. In addition, a quantity (3 times) of times of receiving the overcurrent signal within 3 ms is greater than a preset quantity threshold (2 times). In this case, the integration circuit is controlled to discharge.

It may be understood that an excessively large current stored in the inductor also causes output voltage overshoot of the DC/DC converter. Therefore, accuracy of overshoot risk detection can be further improved in both of the foregoing two implementations.

Further, the overshoot detection apparatus controls the integration circuit to discharge and reduces a soft start voltage slope of the DC/DC converter when the operating status parameter of the DC/DC converter meets the operating status parameter requirement, and a quantity of times of receiving the overcurrent signal output by the overcurrent protection circuit within the first preset duration is greater than or equal to the preset quantity threshold. For a specific implementation of discharging the integration circuit and reducing the soft start voltage slope of the DC/DC converter, refer to descriptions of a corresponding part in FIG. 2a. Details are not described herein again.

In addition, the overshoot detection apparatus sets the soft start voltage slope of the DC/DC converter to the initial soft start voltage slope when the operating status parameter of the DC/DC converter does not meet the operating status parameter requirement.

In this embodiment of this application, in a soft start process, if it is detected that the operating status parameter of the DC/DC converter meets the operating parameter requirement and a quantity of times of receiving the overcurrent signal within preset duration is greater than or equal to a preset quantity, that is, when it is determined that an overshoot risk exists in the DC/DC converter, the overshoot detection apparatus controls a discharge circuit (the switching power transistor Q) to discharge the integration circuit, so as to avoid a case in which the output of the integration circuit is excessively high or saturated, thereby effectively avoiding a case in which output voltage overshoot occurs when the soft start of the DC/DC converter ends. Further, when an overshoot risk of the DC/DC converter is detected, the soft start voltage slope may be further reduced. Because a main reason for output voltage overshoot of the DC/DC converter is that the rising slope of the output voltage of the DC/DC converter lags behind the soft start voltage slope, the foregoing manner can further avoid a case in which output voltage overshoot of the DC/DC converter occurs when the soft start ends. In addition, an excessively large current stored in the inductor also causes output voltage overshoot of the DC/DC converter. Therefore, accuracy of overshoot risk detection can be further improved.

Figure 3A:
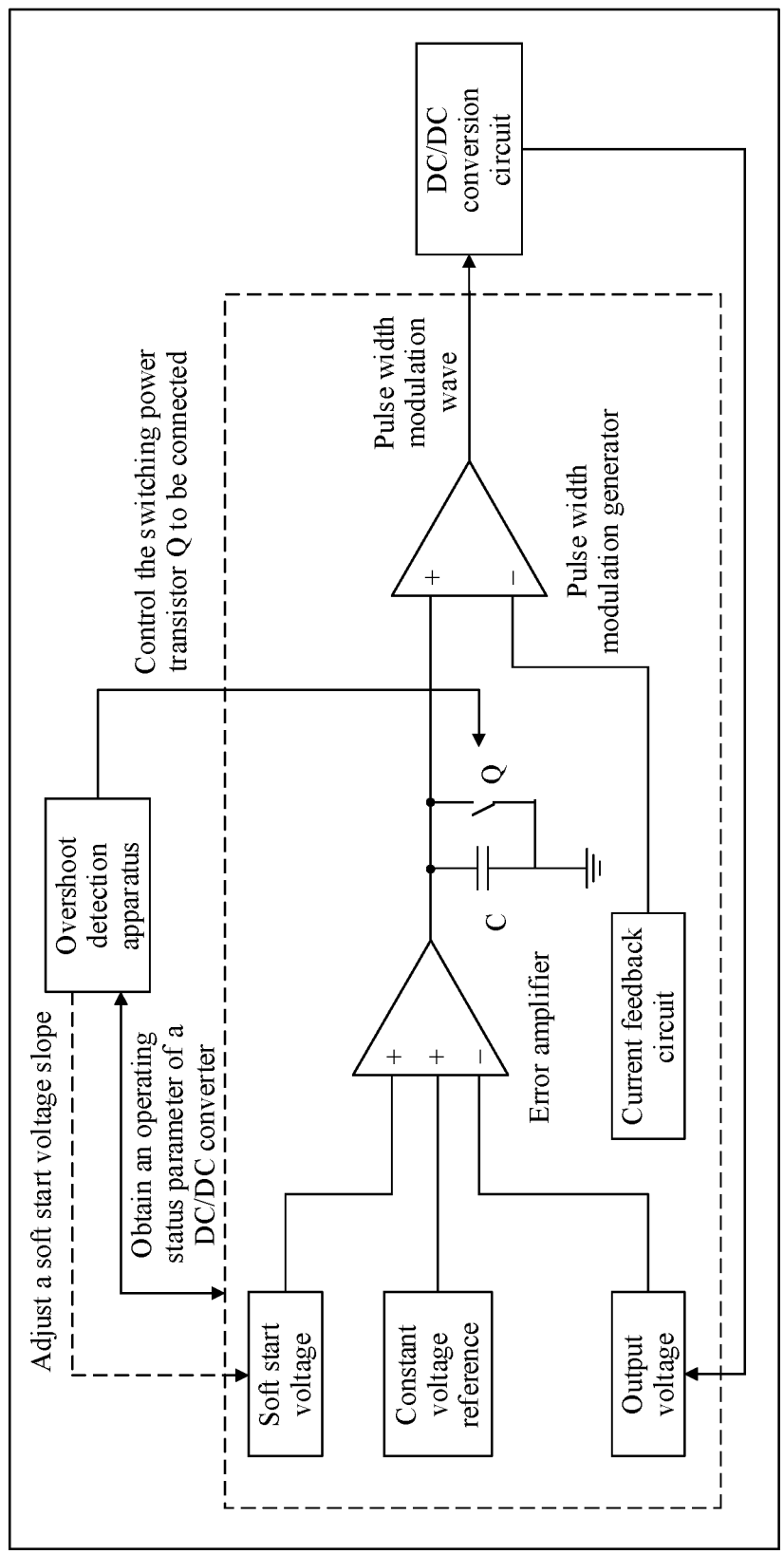
FIG. 3a is a schematic diagram of a structure of a DC/DC converter that uses a current control mode according to this application.

For example, FIG. 3a is a schematic diagram of a structure of a DC/DC converter that uses a current control mode according to this application. As shown in FIG. 3a, the DC/DC converter includes a DC/DC conversion circuit, an overshoot detection apparatus, an error amplifier with three input ports, a pulse width modulation generator, and an integration circuit connected to an output port of the error amplifier. An output voltage of the DC/DC conversion circuit is connected to a negative input port of the error amplifier, a constant voltage reference and a soft start voltage are connected to two positive input ports of the error amplifier, and a voltage difference between the output voltage of the DC/DC conversion circuit and a lower voltage in the constant voltage reference and the soft start voltage is amplified by the error amplifier to obtain an amplified voltage. Usually, there is an integration circuit connected to the output port of the error amplifier, and the integration circuit is configured to perform integration processing on the voltage difference in a soft start process and control an amplitude of the amplified voltage that is input by the error amplifier to the pulse width modulation generator. After the soft start ends (that is, when the DC/DC converter is operating normally), the voltage difference is accumulated, to minimize a difference between an output voltage of the DC/DC converter and a target voltage. The integration circuit shown in FIG. 3a is a capacitor C whose two ports are respectively connected to the output port of the error amplifier and a ground terminal. Another form of integration circuit may also be used. The output of the error amplifier is connected to a positive input port of the pulse width modulation generator. An output port of a current feedback circuit is connected to a negative input port of the pulse width modulation generator. When a voltage at the output port of the current feedback circuit is lower than the amplified voltage output by the error amplifier, the pulse width modulation generator outputs a high level; otherwise, the pulse width modulation generator outputs a low level. Optionally, the pulse width modulation generator may generate a pulse width modulation signal in another manner, for example, in a fixed connection time. In addition, the DC/DC converter further includes a switching power transistor Q connected to the capacitor C in parallel. The switching power transistor is configured to discharge the capacitor C. The switching power transistor Q may include but is not limited to a MOS transistor, an IGBT, a diode, a triode, and the like. Further, the switching power transistor Q may include a clamping circuit, configured to control voltage values at both ports of the capacitor C, so as to discharge the capacitor C.

When detecting that the soft start voltage is greater than or equal to a preset voltage threshold (for example, 50% of the constant voltage reference), or after preset duration after the soft start starts, the overshoot detection apparatus starts to obtain an operating status parameter of the DC/DC converter. When the operating status parameter of the DC/DC converter meets a preset operating status parameter requirement, that is, when it is determined that the DC/DC converter has an overshoot risk, the overshoot detection apparatus controls the integration circuit to discharge. The operating status parameter of the DC/DC converter includes at least one of the voltage difference between the reference voltage (that is, the smaller value in the soft start voltage and the constant voltage reference) and the output voltage of the DC/DC conversion circuit, the amplified voltage, or a duty cycle of a pulse width modulation wave.

In some feasible implementations, the operating status parameter requirement of the DC/DC converter includes that the operating status parameter of the DC/DC converter is greater than or equal to a preset operating status parameter threshold. It may be understood that, whether an overshoot risk exists in the DC/DC converter may be determined based on whether the operating status parameter of the error amplifier or the pulse width modulation generator meets the preset operating status parameter requirement.

In other feasible implementations, the operating status parameter requirement of the DC/DC converter includes that a duration proportion of total duration in which the operating status parameter of the DC/DC converter is greater than or equal to the preset operating status parameter threshold within second preset duration to the second preset duration is greater than or equal to a preset proportion threshold.

It may be understood that the operating status parameter requirement in this implementation may prevent a case in which the operating status parameter requirement in the previous implementation is still met due to a false touch or incorrect sampling data, thereby improving accuracy of overshoot risk detection.

Then, discharging of the integration circuit is controlled when the operating status parameter of the DC/DC converter meets the preset operating status parameter requirement.

In some feasible implementations, when the operating status parameter of the DC/DC converter meets the preset operating status parameter requirement, the overshoot detection apparatus outputs a high level to the switching power transistor Q, to enable the switching power transistor Q to be connected, so as to discharge the capacitor C. Further, the overshoot detection apparatus may further output, to the switching power transistor Q based on the amplified voltage value, a pulse width modulation wave of a duty cycle corresponding to the amplified voltage value, so as to control connection duration of the switching power transistor Q, so as to implement full or partial discharge of the capacitor C.

It may be understood that in this implementation, the manner of discharging the capacitor C when it is determined that the DC/DC converter has an overshoot risk can effectively avoid a case in which the output of the capacitor C is excessively high or saturated when the soft start ends, thereby effectively avoiding a case in which output voltage overshoot occurs when the soft start of the DC/DC converter ends.

In other feasible implementations, when the operating status parameter of the DC/DC converter meets the preset operating status parameter requirement, the overshoot detection apparatus outputs a high level to the switching power transistor Q, to enable the switching power transistor Q to be connected, so as to discharge the capacitor C. In addition, a soft start voltage slope of the DC/DC converter is reduced, that is, the soft start voltage slope is reduced from an initial soft start voltage slope to a first soft start voltage slope. The first soft start voltage slope is a positive number that is less than the initial soft start voltage slope.

It may be understood that, compared with the previous implementation, in this implementation, a manner of reducing the soft start voltage slope is added, so as to avoid a case in which the difference accumulated on the capacitor C continuously increases and a vicious cycle occurs because the rising slope of the output voltage lags behind the soft start voltage slope due to a single soft start voltage slope. In addition, this can further effectively avoid a case in which the output of the capacitor C is excessively high or saturated when the soft start ends, so as to effectively avoid a case in which output voltage overshoot occurs when the soft start of the DC/DC converter ends.

In addition, the overshoot detection apparatus sets the soft start voltage slope of the DC/DC converter to the initial soft start voltage slope when the operating status parameter of the DC/DC converter does not meet the operating status parameter requirement. Herein, the soft start voltage slope may alternatively be adjusted by using a charging current or a stepper slope.

It may be understood that when it is determined that the DC/DC converter does not have an overshoot risk, the soft start is performed at the initial soft start slope, so that a soft start time can be effectively shortened. It may be further explained herein that after the soft start voltage slope is reduced, when it is determined that the DC/DC converter no longer has an overshoot risk, the overshoot detection apparatus increases the reduced soft start voltage slope to the initial soft start slope, so as to effectively improve soft start efficiency.

In this embodiment of this application, in a soft start process, if it is detected that the operating status parameter of the DC/DC converter meets the operating parameter requirement, that is, when it is detected that an overshoot risk exists in the DC/DC converter, the overshoot detection apparatus controls a discharge circuit (the switching power transistor Q) to discharge the integration circuit, so as to avoid a case in which the output of the integration circuit is excessively high or saturated, thereby effectively avoiding a case in which output voltage overshoot occurs when the soft start of the DC/DC converter ends. Further, when an overshoot risk of the DC/DC converter is detected, the soft start voltage slope may be further reduced. Because a main reason for output voltage overshoot of the DC/DC converter is that the rising slope of the output voltage of the DC/DC converter lags behind the soft start voltage slope, the foregoing manner can further avoid a case in which output voltage overshoot of the DC/DC converter occurs when the soft start ends.

Figure 3B:
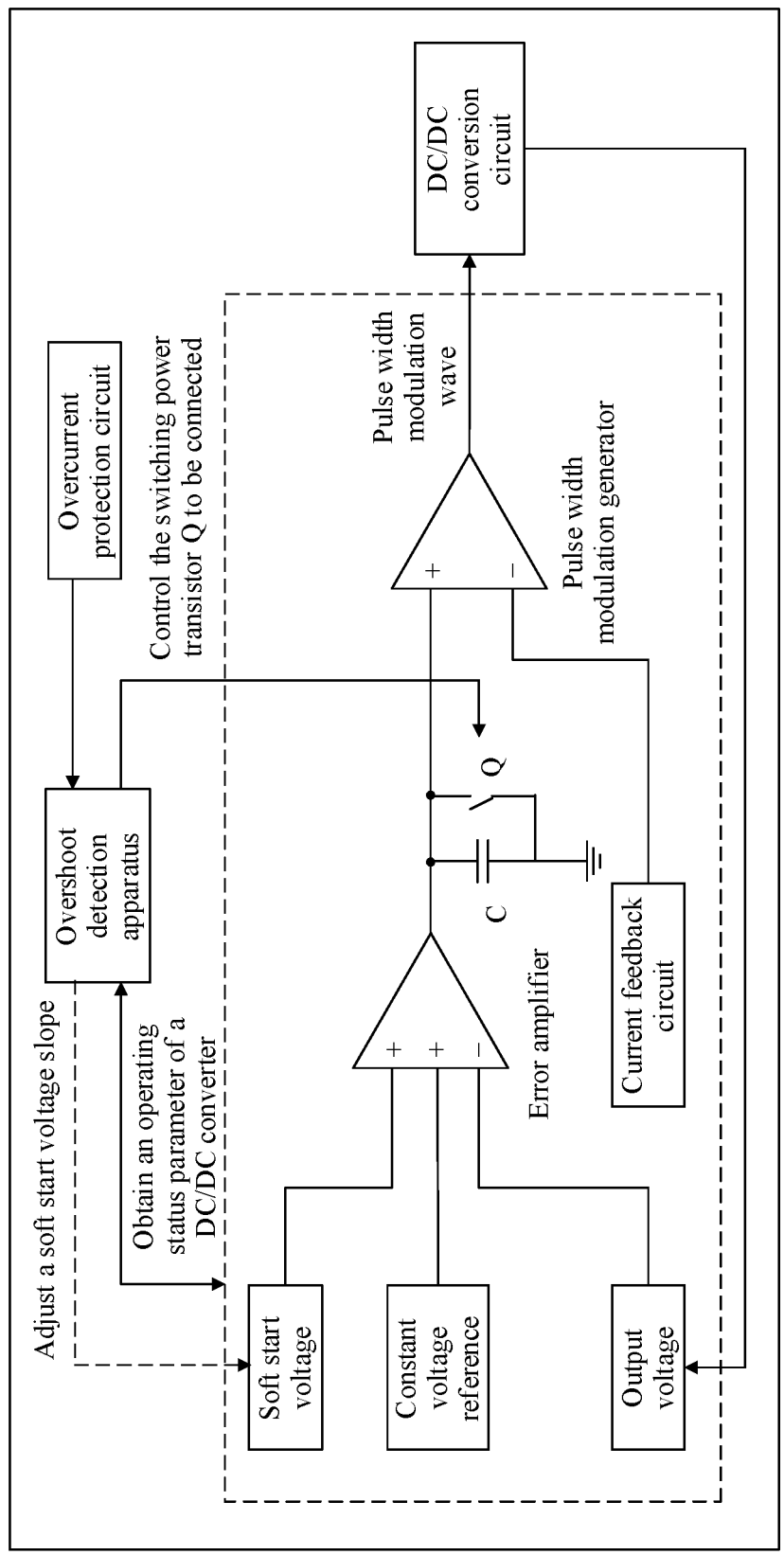
FIG. 3b is a schematic diagram of a structure of another DC/DC converter that uses a current control mode according to this application.

Further, the DC/DC converter shown in FIG. 3a may further include an overcurrent protection circuit. For details, refer to a schematic diagram of a structure of another DC/DC converter that uses a current control mode shown in FIG. 3b. As shown in FIG. 3b, an output port of the overcurrent protection circuit is connected to the overshoot detection apparatus, and is configured to output an overcurrent signal to the overshoot detection apparatus when the overcurrent protection circuit is triggered.

The overshoot detection apparatus controls the integration circuit to discharge when the operating status parameter of the DC/DC converter meets the operating status parameter requirement, and a quantity of times of receiving the overcurrent signal output by the overcurrent protection circuit within first preset duration is greater than or equal to a preset quantity threshold.

In some feasible implementations, the preset operating status parameter requirement may include at least one of the following: The voltage difference between the reference voltage and the output voltage is greater than or equal to a preset voltage difference threshold, the amplified voltage is greater than or equal to a preset amplified voltage threshold, or the duty cycle of the pulse width modulation wave is greater than or equal to a preset duty cycle threshold.

In other feasible implementations, the preset operating status parameter may be at least one of the following: A duration proportion of total duration in which a voltage difference between the reference voltage and the output voltage is greater than or equal to a preset voltage difference threshold within the second preset duration to the second preset duration is greater than a first preset proportion threshold; or a duration proportion of total duration in which the amplified voltage is greater than or equal to a preset amplified voltage threshold within the second preset duration to the second preset duration is greater than a second preset proportion threshold; or a duration proportion of total duration in which the duty cycle of the pulse width modulation wave is greater than or equal to a preset duty cycle threshold within the second preset duration to the second preset duration is greater than a third preset proportion threshold. A time period corresponding to the first preset duration and a time period corresponding to the second preset duration may be all the same, or may be partially the same. This is not limited herein.

It may be understood that an excessively large current stored in the inductor also causes output voltage overshoot of the DC/DC converter. Therefore, accuracy of overshoot risk detection can be further improved in both of the foregoing two implementations.

Further, the overshoot detection apparatus controls the integration circuit to discharge and reduces a soft start voltage slope of the DC/DC converter when the operating status parameter of the DC/DC converter meets the operating status parameter requirement, and a quantity of times of receiving the overcurrent signal output by the overcurrent protection circuit within the first preset duration is greater than or equal to the preset quantity threshold. For a specific implementation of discharging the integration circuit and reducing the soft start voltage slope of the DC/DC converter, refer to descriptions of a corresponding part in FIG. 3a. Details are not described herein again.

In addition, the overshoot detection apparatus sets the soft start voltage slope of the DC/DC converter to the initial soft start voltage slope when the operating status parameter of the DC/DC converter does not meet the operating status parameter requirement.

In this embodiment of this application, in a soft start process, if it is detected that the operating status parameter of the DC/DC converter meets the operating parameter requirement and a quantity of times of receiving the overcurrent signal within preset duration is greater than or equal to a preset quantity, that is, when it is determined that an overshoot risk exists in the DC/DC converter, the overshoot detection apparatus controls a discharge circuit (the switching power transistor Q) to discharge the integration circuit, so as to avoid a case in which the output of the integration circuit is excessively high or saturated, thereby effectively avoiding a case in which output voltage overshoot occurs when the soft start of the DC/DC converter ends. Further, when an overshoot risk of the DC/DC converter is detected, the soft start voltage slope may be further reduced. Because a main reason for output voltage overshoot of the DC/DC converter is that the rising slope of the output voltage of the DC/DC converter lags behind the soft start voltage slope, the foregoing manner can further avoid a case in which output voltage overshoot of the DC/DC converter occurs when the soft start ends. In addition, an excessively large current stored in the inductor also causes output voltage overshoot of the DC/DC converter. Therefore, accuracy of overshoot risk detection can be further improved.

Figure 4A:
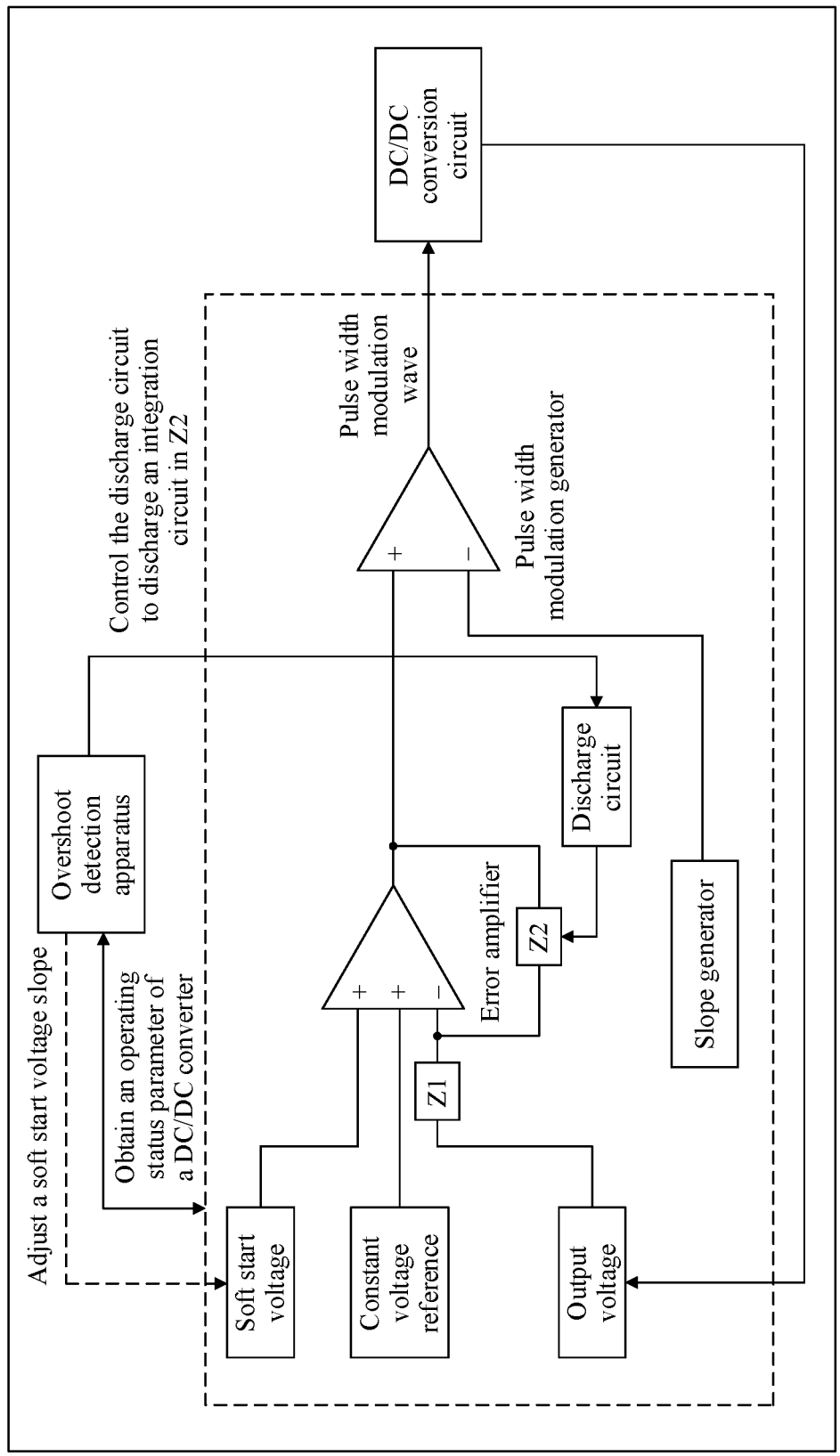
FIG. 4a is a schematic diagram of a structure of a DC/DC converter that uses a voltage control mode according to this application.

For example, FIG. 4a is a schematic diagram of a structure of a DC/DC converter that uses a voltage control mode according to this application. As shown in FIG. 4a, the DC/DC converter includes a DC/DC conversion circuit, an overshoot detection apparatus, an error amplifier with three input ports, a pulse width modulation generator, and an integration circuit connected to an output port of the error amplifier. An output voltage of the DC/DC conversion circuit is connected to a negative input port of the error amplifier, a constant voltage reference and a soft start voltage are connected to two positive input ports of the error amplifier, and a voltage difference between the output voltage and a lower voltage in the constant voltage reference and the soft start voltage is amplified by the error amplifier to obtain an amplified voltage. Usually, there is an integration circuit connected to the output port of the error amplifier, and the integration circuit is configured to perform integration processing on the voltage difference in a soft start process and control an amplitude of the amplified voltage that is input by the error amplifier to the pulse width modulation generator. After the soft start ends (that is, when the DC/DC converter is operating normally), the voltage difference is accumulated, to minimize a difference between an output voltage of the DC/DC converter and a target voltage. Z1 and Z2 shown in FIG. 4a form a phase compensation circuit. Z2 includes the integration circuit. For example, Z2 is a capacitor C, and two ports of the capacitor C are respectively connected to the negative input port and the output port of the error amplifier. Another form of integration circuit may also be used. The output of the error amplifier is connected to a positive input port of the pulse width modulation generator. An output port of a slope generator is connected to a negative input port of the pulse width modulation generator. When a voltage at the output port of the slope generator is lower than the amplified voltage output by the error amplifier, the pulse width modulation generator outputs a high level; otherwise, the pulse width modulation generator outputs a low level. Optionally, the pulse width modulation generator may generate a pulse width modulation signal in another manner, for example, in a fixed connection time. In addition, the DC/DC converter further includes a discharge circuit that is connected to the integration circuit in Z2 in parallel and configured to discharge the integration circuit.

When detecting that the soft start voltage is greater than or equal to a preset voltage threshold (for example, 50% of the constant voltage reference), or after preset duration after the soft start starts, the overshoot detection apparatus starts to obtain an operating status parameter of the DC/DC converter. When the operating status parameter of the DC/DC converter meets a preset operating status parameter requirement, that is, when it is determined that the DC/DC converter has an overshoot risk, the overshoot detection apparatus controls the integration circuit to discharge. The operating status parameter of the DC/DC converter includes at least one of the voltage difference between the reference voltage (that is, the smaller value in the soft start voltage and the constant voltage reference) and the output voltage of the DC/DC conversion circuit, the amplified voltage, or a duty cycle of a pulse width modulation wave.

In some feasible implementations, the operating status parameter requirement of the DC/DC converter includes that the operating status parameter of the DC/DC converter is greater than or equal to a preset operating status parameter threshold. It may be understood that, whether an overshoot risk exists in the DC/DC converter may be determined based on whether the operating status parameter of the error amplifier or the pulse width modulation generator meets the preset operating status parameter requirement.

In other feasible implementations, the operating status parameter requirement of the DC/DC converter includes that a duration proportion of total duration in which the operating status parameter of the DC/DC converter is greater than or equal to the preset operating status parameter threshold within second preset duration to the second preset duration is greater than or equal to a preset proportion threshold.

It may be understood that the operating status parameter requirement in this implementation may prevent a case in which the operating status parameter requirement in the previous implementation is still met due to a false touch or incorrect sampling data, thereby improving accuracy of overshoot risk detection.

Then, discharging of the integration circuit is controlled when the operating status parameter of the DC/DC converter meets the preset operating status parameter requirement.

The following uses an example in which Z2 is the capacitor C and the discharge circuit is the switching power transistor Q connected in parallel to two ports of the capacitor C to describe an implementation in which the overshoot detection apparatus controls the integration circuit to discharge.

In some feasible implementations, when the operating status parameter of the DC/DC converter meets the preset operating status parameter requirement, the overshoot detection apparatus outputs a high level to the switching power transistor Q, to enable the switching power transistor Q to be connected, so as to discharge the capacitor C. Further, the overshoot detection apparatus may further output, to the switching power transistor Q based on the amplified voltage value, a pulse width modulation wave of a duty cycle corresponding to the amplified voltage value, so as to control connection duration of the switching power transistor Q, so as to implement full or partial discharge of the capacitor C.

It may be understood that in this implementation, the manner of discharging the capacitor C when it is determined that the DC/DC converter has an overshoot risk can effectively avoid a case in which the output of the capacitor C is excessively high or saturated when the soft start ends, thereby effectively avoiding a case in which output voltage overshoot occurs when the soft start of the DC/DC converter ends.

In other feasible implementations, when the operating status parameter of the DC/DC converter meets the preset operating status parameter requirement, the overshoot detection apparatus outputs a high level to the switching power transistor Q, to enable the switching power transistor Q to be connected, so as to discharge the capacitor C. In addition, a soft start voltage slope of the DC/DC converter is reduced, that is, the soft start voltage slope is reduced from an initial soft start voltage slope to a first soft start voltage slope. The first soft start voltage slope is a positive number that is less than the initial soft start voltage slope.

It may be understood that, compared with the previous implementation, in this implementation, a manner of reducing the soft start voltage slope is added, so as to avoid a case in which the difference accumulated on the capacitor C continuously increases and a vicious cycle occurs because the rising slope of the output voltage lags behind the soft start voltage slope due to a single soft start voltage slope. In addition, this can further effectively avoid a case in which the output of the capacitor C is excessively high or saturated when the soft start ends, so as to effectively avoid a case in which output voltage overshoot occurs when the soft start of the DC/DC converter ends.

In addition, the overshoot detection apparatus sets the soft start voltage slope of the DC/DC converter to the initial soft start voltage slope when the operating status parameter of the DC/DC converter does not meet the operating status parameter requirement. Herein, the soft start voltage slope may alternatively be adjusted by using a charging current or a stepper slope.

It may be understood that when it is determined that the DC/DC converter does not have an overshoot risk, the soft start is performed at the initial soft start slope, so that a soft start time can be effectively shortened. It may be further explained herein that after the soft start voltage slope is reduced, when it is determined that the DC/DC converter no longer has an overshoot risk, the overshoot detection apparatus increases the reduced soft start voltage slope to the initial soft start slope, so as to effectively improve soft start efficiency.

In this embodiment of this application, in a soft start process, if it is detected that the operating status parameter of the DC/DC converter meets the operating status parameter requirement, that is, when it is determined that an overshoot risk exists in the DC/DC converter, the overshoot detection apparatus controls the discharge circuit to discharge the integration circuit, so as to avoid a case in which the output of the integration circuit is excessively high or saturated, thereby effectively avoiding a case in which output voltage overshoot occurs when the soft start of the DC/DC converter ends. Further, when an overshoot risk of the DC/DC converter is detected, the soft start voltage slope may be further reduced. Because a main reason for output voltage overshoot of the DC/DC converter is that the rising slope of the output voltage of the DC/DC converter lags behind the soft start voltage slope, the foregoing manner can further avoid a case in which output voltage overshoot of the DC/DC converter occurs when the soft start ends.

Figure 4B:
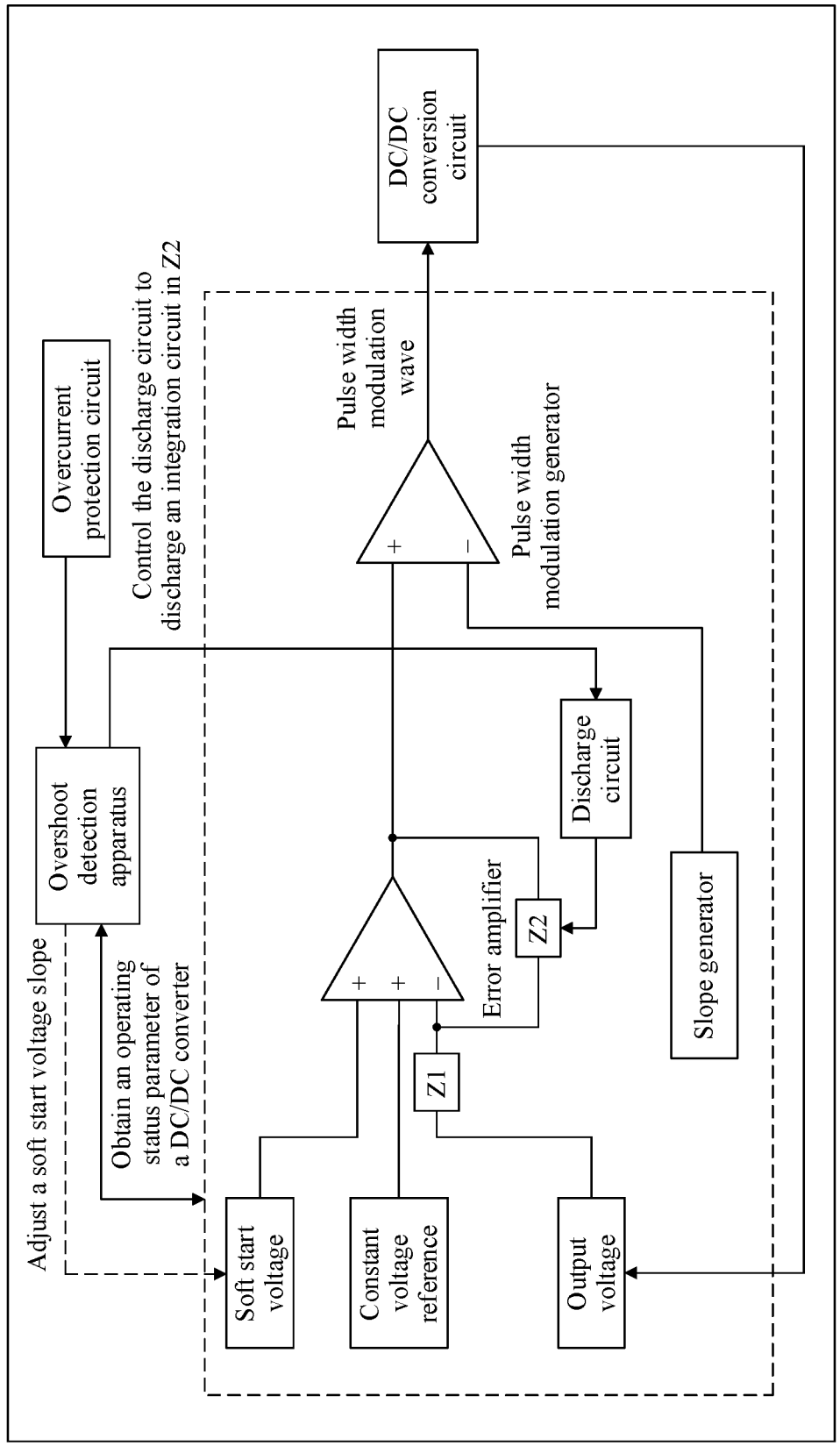
FIG. 4b is a schematic diagram of a structure of another DC/DC converter that uses a voltage control mode according to this application.

Further, the DC/DC converter shown in FIG. 4a may further include an overcurrent protection circuit. For details, refer to a schematic diagram of a structure of another DC/DC converter that uses a voltage control mode shown in FIG. 4b. As shown in FIG. 4b, an output port of the overcurrent protection circuit is connected to the overshoot detection apparatus, and is configured to output an overcurrent signal to the overshoot detection apparatus when the overcurrent protection circuit is triggered.

The overshoot detection apparatus controls the integration circuit to discharge when the operating status parameter of the DC/DC converter meets the operating status parameter requirement, and a quantity of times of receiving the overcurrent signal output by the overcurrent protection circuit within first preset duration is greater than or equal to a preset quantity threshold.

In some feasible implementations, the preset operating status parameter requirement may include at least one of the following: The voltage difference between the reference voltage and the output voltage is greater than or equal to a preset voltage difference threshold, the amplified voltage is greater than or equal to a preset amplified voltage threshold, or the duty cycle of the pulse width modulation wave is greater than or equal to a preset duty cycle threshold.

In other feasible implementations, the preset operating status parameter may be at least one of the following: A duration proportion of total duration in which a voltage difference between the reference voltage and the output voltage is greater than or equal to a preset voltage difference threshold within the second preset duration to the second preset duration is greater than a first preset proportion threshold; or a duration proportion of total duration in which the amplified voltage is greater than or equal to a preset amplified voltage threshold within the second preset duration to the second preset duration is greater than a second preset proportion threshold; or a duration proportion of total duration in which the duty cycle of the pulse width modulation wave is greater than or equal to a preset duty cycle threshold within the second preset duration to the second preset duration is greater than a third preset proportion threshold. A time period corresponding to the first preset duration and a time period corresponding to the second preset duration may be all the same, or may be partially the same. This is not limited herein.

It may be understood that an excessively large current stored in the inductor also causes output voltage overshoot of the DC/DC converter. Therefore, accuracy of overshoot risk detection can be further improved in both of the foregoing two implementations.

Further, the overshoot detection apparatus controls the integration circuit to discharge and reduces a soft start voltage slope of the DC/DC converter when the operating status parameter of the DC/DC converter meets the operating status parameter requirement, and a quantity of times of receiving the overcurrent signal output by the overcurrent protection circuit within the first preset duration is greater than or equal to the preset quantity threshold. For a specific implementation of discharging the integration circuit and reducing the soft start voltage slope of the DC/DC converter, refer to descriptions of a corresponding part in FIG. 4a. Details are not described herein again.

In addition, the overshoot detection apparatus sets the soft start voltage slope of the DC/DC converter to the initial soft start voltage slope when the operating status parameter of the DC/DC converter does not meet the operating status parameter requirement.

In this embodiment of this application, in a soft start process, if it is detected that the operating status parameter of the DC/DC converter meets the operating parameter requirement and a quantity of times of receiving the overcurrent signal within preset duration is greater than or equal to a preset quantity, that is, when it is determined that an overshoot risk exists in the DC/DC converter, the overshoot detection apparatus controls a discharge circuit (the switching power transistor Q) to discharge the integration circuit, so as to avoid a case in which the output of the integration circuit is excessively high or saturated, thereby effectively avoiding a case in which output voltage overshoot occurs when the soft start of the DC/DC converter ends. Further, when an overshoot risk of the DC/DC converter is detected, the soft start voltage slope may be further reduced. Because a main reason for output voltage overshoot of the DC/DC converter is that the rising slope of the output voltage of the DC/DC converter lags behind the soft start voltage slope, the foregoing manner can further avoid a case in which output voltage overshoot of the DC/DC converter occurs when the soft start ends. In addition, an excessively large current stored in the inductor also causes output voltage overshoot of the DC/DC converter. Therefore, accuracy of overshoot risk detection can be further improved.

The following describes a soft start overshoot prevention method for a DC/DC converter with reference to FIG. 1 to FIG. 4b.

Figure 5:
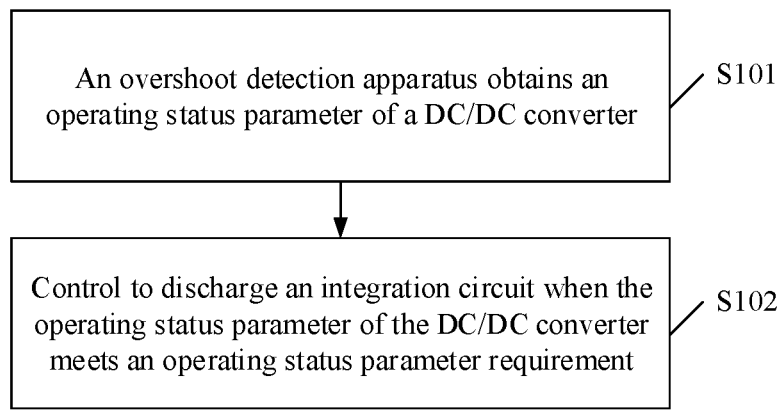
FIG. 5 is a schematic flowchart of a soft start overshoot prevention method for a DC/DC converter according to this application.

FIG. 5 is a schematic flowchart of a soft start overshoot prevention method for a DC/DC converter according to this application. The soft start overshoot prevention method for a DC/DC converter according to an embodiment of this application may include the following steps.

S101: An overshoot detection apparatus obtains an operating status parameter of the DC/DC converter.

Specifically, when detecting that a soft start voltage is greater than or equal to a preset voltage threshold (for example, 50% of a constant voltage reference), or after preset duration after a soft start starts, the overshoot detection apparatus starts to obtain the operating status parameter of the DC/DC converter, and determines whether the operating status parameter of the DC/DC converter meets an operating status parameter requirement. The operating status parameter of the DC/DC converter includes at least one of a voltage difference between a reference voltage (that is, a smaller value in the soft start voltage and the constant voltage reference) and an output voltage of a DC/DC conversion circuit, an amplified voltage, or a duty cycle of a pulse width modulation wave.

S102: Control an integration circuit to discharge when the operating status parameter of the DC/DC converter meets the operating status parameter requirement.

In an optional embodiment, when the operating status parameter of the DC/DC converter meets the operating status parameter requirement, that is, when it is determined that the DC/DC converter has an overshoot risk, the overshoot detection apparatus controls the integration circuit to discharge.

In some feasible implementations, the operating status parameter requirement of the DC/DC converter includes that the operating status parameter of the DC/DC converter is greater than or equal to a preset operating status parameter threshold.

Specifically, the preset operating status parameter requirement may include at least one of the following: The voltage difference between the reference voltage and the output voltage of the DC/DC conversion circuit is greater than or equal to a preset voltage difference threshold, the amplified voltage is greater than or equal to a preset amplified voltage threshold, or the duty cycle of the pulse width modulation wave is greater than or equal to a preset duty cycle threshold. It may be understood that, whether an overshoot risk exists in the DC/DC converter may be determined based on whether an operating status parameter of an error amplifier or a pulse width modulation generator meets the preset operating status parameter requirement.

In other feasible implementations, the operating status parameter requirement of the DC/DC converter includes that a duration proportion of total duration in which the operating status parameter of the DC/DC converter is greater than or equal to the preset operating status parameter threshold within second preset duration to the second preset duration is greater than or equal to a preset proportion threshold.

Specifically, the preset operating status parameter may be at least one of the following: A duration proportion of total duration in which a voltage difference between the reference voltage and the output voltage of the DC/DC conversion circuit is greater than or equal to a preset voltage difference threshold within the second preset duration to the second preset duration is greater than a first preset proportion threshold; or a duration proportion of total duration in which the amplified voltage is greater than or equal to a preset amplified voltage threshold within the second preset duration to the second preset duration is greater than a second preset proportion threshold; or a duration proportion of total duration in which the duty cycle of the pulse width modulation wave is greater than or equal to a preset duty cycle threshold within the second preset duration to the second preset duration is greater than a third preset proportion threshold. The first preset proportion threshold, the second preset proportion threshold, and the third preset proportion threshold may be totally the same, or may be different from each other. This is not limited herein.

It may be understood that the operating status parameter requirement in this implementation may prevent a case in which the operating status parameter requirement in the previous implementation is still met due to a false touch or incorrect sampling data, thereby improving accuracy of overshoot risk detection.

Then, discharging of the integration circuit is controlled when the operating status parameter of the DC/DC converter meets the preset operating status parameter requirement.

For example, the DC/DC converter further includes a switching power transistor Q that is connected to the integration circuit in parallel, and is configured to discharge the integration circuit.

In some feasible implementations, when the operating status parameter of the DC/DC converter meets the preset operating status parameter requirement, the overshoot detection apparatus controls the switching power transistor Q to be connected, so as to discharge the integration circuit. Further, the overshoot detection apparatus may further output, to the switching power transistor Q based on the amplified voltage value, a pulse width modulation wave of a duty cycle corresponding to the amplified voltage value, so as to control connection duration of the switching power transistor Q, so as to implement full or partial discharge of the integration circuit.

It may be understood that in this implementation, the manner of discharging the integration circuit when it is determined that the DC/DC converter has an overshoot risk can effectively avoid a case in which the output of the integration circuit is excessively high or saturated when the soft start ends, thereby effectively avoiding a case in which output voltage overshoot occurs when the soft start of the DC/DC converter ends.

In other feasible implementations, when the operating status parameter of the DC/DC converter meets the preset operating status parameter requirement, the overshoot detection apparatus outputs a high level to the switching power transistor Q, to enable the switching power transistor Q to be connected, so as to discharge the integration circuit. In addition, a soft start voltage slope of the DC/DC converter is reduced, that is, the soft start voltage slope is reduced from an initial soft start voltage slope to a first soft start voltage slope. The first soft start voltage slope is a positive number that is less than the initial soft start voltage slope. For example, the overshoot detection apparatus may reduce a charging current of a capacitor in a soft start circuit, to reduce the soft start voltage, so as to reduce the soft start voltage slope. The overshoot detection apparatus may alternatively reduce the soft start voltage slope by using a stepper slope.

It may be understood that, compared with the previous implementation, in this implementation, a manner of reducing the soft start voltage slope is added, so as to avoid a case in which the difference accumulated on the integration circuit continuously increases and a vicious cycle occurs because the rising slope of the output voltage lags behind the soft start voltage slope due to a single soft start voltage slope. In addition, this can further effectively avoid a case in which the output of the integration circuit is excessively high or saturated when the soft start ends, so as to effectively avoid a case in which output voltage overshoot occurs when the soft start of the DC/DC converter ends.

In another optional embodiment, the DC/DC converter further includes an overcurrent protection circuit. An output port of the overcurrent protection circuit is connected to the overshoot detection apparatus, and is used to output an overcurrent signal to the overshoot detection apparatus when the overcurrent protection circuit is triggered.

The overshoot detection apparatus controls the integration circuit to discharge when the operating status parameter of the DC/DC converter meets the operating status parameter requirement, and a quantity of times of receiving the overcurrent signal output by the overcurrent protection circuit within first preset duration is greater than or equal to a preset quantity threshold.

In some feasible implementations, the preset operating status parameter requirement may include at least one of the following: The voltage difference between the reference voltage and the output voltage is greater than or equal to a preset voltage difference threshold, the amplified voltage is greater than or equal to a preset amplified voltage threshold, or the duty cycle of the pulse width modulation wave is greater than or equal to a preset duty cycle threshold.

In other feasible implementations, the preset operating status parameter may be at least one of the following: A duration proportion of total duration in which a voltage difference between the reference voltage and the output voltage is greater than or equal to a preset voltage difference threshold within the second preset duration to the second preset duration is greater than a first preset proportion threshold; or a duration proportion of total duration in which the amplified voltage is greater than or equal to a preset amplified voltage threshold within the second preset duration to the second preset duration is greater than a second preset proportion threshold; or a duration proportion of total duration in which the duty cycle of the pulse width modulation wave is greater than or equal to a preset duty cycle threshold within the second preset duration to the second preset duration is greater than a third preset proportion threshold. A time period corresponding to the first preset duration and a time period corresponding to the second preset duration may be all the same, or may be partially the same. This is not limited herein.

It may be understood that an excessively large current stored in the inductor also causes output voltage overshoot of the DC/DC converter. Therefore, accuracy of overshoot risk detection can be further improved in both of the foregoing two implementations.

Further, the overshoot detection apparatus controls the integration circuit to discharge and reduces a soft start voltage slope of the DC/DC converter when the operating status parameter of the DC/DC converter meets the operating status parameter requirement, and a quantity of times of receiving the overcurrent signal output by the overcurrent protection circuit within the first preset duration is greater than or equal to the preset quantity threshold. For a specific implementation of discharging the integration circuit and reducing the soft start voltage slope of the DC/DC converter, refer to descriptions of a corresponding part in FIG. 2a. Details are not described herein again.

In addition, the overshoot detection apparatus sets the soft start voltage slope of the DC/DC converter to the initial soft start voltage slope when the operating status parameter of the DC/DC converter does not meet the operating status parameter requirement. Herein, the soft start voltage slope may alternatively be adjusted by using a charging current or a stepper slope.

It may be understood that when it is determined that the DC/DC converter does not have an overshoot risk, the soft start is performed at the initial soft start slope, so that a soft start time can be effectively shortened. It may be further explained herein that after the soft start voltage slope is reduced, when it is determined that the DC/DC converter no longer has an overshoot risk, the overshoot detection apparatus increases the reduced soft start voltage slope to the initial soft start slope, so as to effectively improve soft start efficiency.

In this application, in a soft start process, if it is detected that the operating status parameter of the DC/DC converter meets the operating status parameter requirement, that is, when it is detected that an overshoot risk exists in the DC/DC converter, the overshoot detection apparatus discharges the integration circuit in a timely manner, so as to effectively avoid a case in which an output of the integration circuit is excessively high or saturated when the soft start ends, thereby effectively avoiding a case in which output voltage overshoot occurs when the soft start of the DC/DC converter ends.

The foregoing description provides exemplary embodiments and implementations of this application, but is not intended to limit the protection scope of this application. Any variation or replacement readily figured out by a person skilled in the art within the technical scope disclosed in this application may fall within the protection scope of this application.

What is claimed is:
1. A DC/DC converter, comprising:
   a DC/DC conversion circuit;
   an overshoot detection apparatus;
   a pulse width modulation generator;
   an error amplifier; and
   an integration circuit connected to an output port of the error amplifier;
   wherein the error amplifier is configured to: amplify a difference between an output voltage of the DC/DC conversion circuit and a reference voltage to generate an amplified voltage, and output the amplified voltage to the pulse width modulation generator;
   wherein the pulse width modulation generator is configured to: generate a pulse width modulation wave based on the amplified voltage, and output the pulse width modulation wave to the DC/DC conversion circuit;
   wherein the DC/DC conversion circuit is configured to control the output voltage of the DC/DC conversion circuit based on the pulse width modulation wave;
   wherein the integration circuit is configured to: perform integration processing on the difference between the reference voltage and the output voltage, and control an amplitude of the amplified voltage that is input by the error amplifier to the pulse width modulation generator; and
   wherein the overshoot detection apparatus is configured to:
      obtain an operating status parameter of the DC/DC converter, and control the integration circuit to discharge based on the operating status parameter of the DC/DC converter meeting an operating status parameter requirement.

2. The DC/DC converter according to claim 1, wherein the overshoot detection apparatus is further configured to obtain the operating status parameter of the DC/DC converter based on a determination that a soft start voltage of the DC/DC converter is greater than or equal to a preset voltage threshold.

3. The DC/DC converter according to claim 1, wherein the DC/DC converter further comprises an overcurrent protection circuit, wherein the overcurrent protection circuit is connected to the overshoot detection apparatus and is configured to output an overcurrent signal to the overshoot detection apparatus based on the overcurrent protection circuit being triggered; and
wherein controlling the integration circuit to discharge when the operating status parameter of the DC/DC converter meets an operating status parameter requirement comprises:
controlling the integration circuit to discharge based on the operating status parameter of the DC/DC converter meeting the operating status parameter requirement and a quantity of times of receiving the overcurrent signal output by the overcurrent protection circuit within a first preset duration being greater than or equal to a preset quantity threshold.

4. The DC/DC converter according to claim 1, wherein the operating status parameter requirement comprises a duration proportion of total duration in which the operating status parameter of the DC/DC converter is greater than or equal to a preset operating status parameter threshold within a second preset duration to the second preset duration being greater than or equal to a preset proportion threshold.

5. The DC/DC converter according to claim 1, wherein the overshoot detection apparatus is further configured to reduce a soft start voltage slope of the DC/DC converter based on the operating status parameter of the DC/DC converter meeting the operating status parameter requirement.

6. The DC/DC converter according to claim 1, wherein the DC/DC converter further comprises a switching power transistor connected to the integration circuit in parallel and connected to the overshoot detection apparatus; and
wherein controlling the integration circuit to discharge comprises:
controlling, by the overshoot detection apparatus, connectivity of the switching power transistor to discharge the integrating circuit.

7. The DC/DC converter according to claim 1, wherein the overshoot detection apparatus is further configured to set a soft start voltage slope of the DC/DC converter to an initial soft start voltage slope based on the operating status parameter of the DC/DC converter not meeting the operating status parameter requirement.

8. The DC/DC converter according to claim 1, wherein the operating status parameter comprises at least one of:
the voltage difference between the reference voltage and the output voltage,
the amplified voltage, or
a duty cycle of the pulse width modulation wave.

9. The DC/DC converter according to claim 1, wherein the reference voltage comprises a constant voltage reference or the soft start voltage of the DC/DC converter.

10. The DC/DC converter according to claim 1, wherein the reference voltage is the smaller of a constant voltage reference and the soft start voltage of the DC/DC converter.

11. A soft start overshoot prevention method for a DC/DC converter, comprising:
amplifying, by an error amplifier of the DC/DC converter, a difference between an output voltage of a DC/DC conversion circuit of the DC/DC converter and a reference voltage to generate an amplified voltage;
outputting, by the error amplifier, the amplified voltage to a pulse width modulation generator of the DC/DC converter;
generating, by the pulse width modulation generator, a pulse width modulation wave based on the amplified voltage;
outputting the pulse width modulation wave to the DC/DC conversion circuit;
controlling, by the DC/DC conversion circuit, the output voltage of the DC/DC conversion circuit based on the pulse width modulation wave;
performing, by an integration circuit of the DC/DC converter, integration processing on the difference between the reference voltage and the output voltage;
controlling, by the integration circuit, an amplitude of the amplified voltage that is input by the error amplifier to the pulse width modulation generator;
obtaining, by an overshoot detection apparatus of the DC/DC converter, an operating status parameter of the DC/DC converter; and
controlling the integration circuit to discharge based on the operating status parameter of the DC/DC converter meeting an operating status parameter requirement.

12. The method according to claim 11, wherein before obtaining the operating status parameter of the DC/DC converter, the method comprises:
determining, by the overshoot detection apparatus, that a soft start voltage of the DC/DC converter is greater than or equal to a preset voltage threshold.

13. The method according to claim 11, further comprising:
outputting, by an overcurrent protection circuit of the DC/DC converter, an overcurrent signal to the overshoot detection apparatus based on the overcurrent protection circuit being triggered; and
wherein controlling the integration circuit to discharge based on the operating status parameter of the DC/DC converter meeting the operating status parameter requirement comprises:
controlling, by the overshoot detection apparatus, the integration circuit to discharge based on the operating status parameter of the DC/DC converter meeting the operating status parameter requirement and a quantity of times of receiving the overcurrent signal output by the overcurrent protection circuit in a first preset duration being greater than or equal to a preset quantity threshold.

14. The method according to claim 11, wherein the operating status parameter requirement comprises a duration proportion of total duration in which the operating status parameter of the DC/DC converter is greater than or equal to a preset operating status parameter threshold within a second preset duration to the second preset duration being greater than or equal to a preset proportion threshold.

15. The method according to claim 11, wherein the method further comprises:
reducing, by the overshoot detection apparatus, a soft start voltage slope of the DC/DC converter based on the operating status parameter of the DC/DC converter meeting the operating status parameter requirement.

16. The method according to claim 11, wherein controlling the integration circuit to discharge comprises:
   controlling, by the overshoot detection apparatus, connectivity of a switching power transistor to discharge the integrating circuit.

17. The method according to claim 11, wherein the method further comprises:
   setting, by the overshoot detection apparatus, a soft start voltage slope of the DC/DC converter to an initial soft start voltage slope based on the operating status parameter of the DC/DC converter not meeting the operating status parameter requirement.

18. The method according to claim 11, wherein the operating status parameter of the DC/DC converter comprises at least one of:
   the voltage difference between the reference voltage and the output voltage,
   the amplified voltage, or
   a duty cycle of the pulse width modulation wave.

19. The method according to claim 11, wherein the reference voltage comprises a constant voltage reference or the soft start voltage of the DC/DC converter.

20. The method according to claim 11, wherein the reference voltage is the smaller of a constant voltage reference and the soft start voltage of the DC/DC converter.

* * * * *